United States Patent
Kageyama et al.

(10) Patent No.: US 8,649,652 B2
(45) Date of Patent: Feb. 11, 2014

(54) SLIDE SHOW DISPLAY SYSTEM WITH BGM, SLIDE SHOW DISPLAY METHOD WITH BGM, INFORMATION PROCESSING DEVICE, PLAYBACK DEVICE, AND PROGRAMS

(75) Inventors: Yuichi Kageyama, Tokyo (JP); Takashi Ito, Tokyo (JP); Youtaro Mine, Kanagawa (JP); Takashi Sasai, Chiba (JP); Atsushi Onoe, Kanagawa (JP)

(73) Assignees: Sony Mobile Communications Inc., Tokyo (JP); Sony Corporation, Tokyo (JP)

( * ) Notice: Subject to any disclaimer, the term of this patent is extended or adjusted under 35 U.S.C. 154(b) by 1064 days.

(21) Appl. No.: 12/368,357

(22) Filed: Feb. 10, 2009

(65) Prior Publication Data

US 2009/0202222 A1 Aug. 13, 2009

(30) Foreign Application Priority Data

Feb. 12, 2008 (JP) ................. P2008-030609

(51) Int. Cl.
*H04N 5/91* (2006.01)

(52) U.S. Cl.
USPC .............. 386/96; 386/353; 386/239

(58) Field of Classification Search
USPC .......................... 386/96, 353, 239
See application file for complete search history.

(56) References Cited

U.S. PATENT DOCUMENTS

| | | |
|---|---|---|
| 2006/0040638 A1 | 2/2006 | McQuaide, Jr. |
| 2006/0056796 A1 | 3/2006 | Nishizawa et al. |
| 2007/0201837 A1* | 8/2007 | Meguro et al. ............... 386/96 |
| 2009/0222514 A1* | 9/2009 | Igarashi .................. 709/203 |

FOREIGN PATENT DOCUMENTS

| | | |
|---|---|---|
| EP | 2000915 | 12/2008 |
| JP | 2006-86622 | 3/2006 |
| JP | 2008-21297 | 1/2008 |
| WO | WO 2006/022706 A2 | 3/2006 |
| WO | WO 2007/105460 A1 | 9/2007 |

OTHER PUBLICATIONS

European search report from the European Patent Office for European Application No. EP 09 25 0220, (Jun. 12, 2009).
Office Action issued Dec. 20, 2011, in Japanese Patent Application No. 2008-030609 (with English-language translation).

* cited by examiner

*Primary Examiner* — Jeffrey Pwu
*Assistant Examiner* — Helai Salehi
(74) *Attorney, Agent, or Firm* — Oblon, Spivak, McClelland, Maier & Neustadt, L.L.P.

(57) ABSTRACT

A slide show display system with BGM includes at least one content provision device that stores at least one of image content and music content, a playback device that plays back the image content and the music content, and an information processing device that controls the playback device to display a slide show with BGM. The information processing device includes a content information notification portion that transmits information on the image content and the music content that will be played back to the playback device, as well as a playback request portion that makes a playback request to the playback device to play back the content. The playback device includes a content acquisition portion that acquires the content from the at least one content provision device and a content playback portion that plays back the content in response to the playback request from the information processing device.

12 Claims, 15 Drawing Sheets

SLIDE SHOW DISPLAY SYSTEM WITH BGM, SLIDE SHOW DISPLAY METHOD WITH BGM, INFORMATION PROCESSING DEVICE, PLAYBACK DEVICE, AND PROGRAMS

CROSS REFERENCES TO RELATED APPLICATIONS

The present invention contains subjected matter related to Japanese Patent Application JP 2008-30609 filed in the Japan Patent Office on Feb. 12, 2008, the entire contents of which being incorporated herein by reference.

BACKGROUND OF THE INVENTION

1. Field of the Invention

The present invention relates to a slide show display system with BGM, a slide show display method with BGM, an information processing device, a playback device, and programs.

2. Description of the Related Art

Many information processing devices such as personal computers and the like are equipped with slide show functions that take still images that have been captured by a digital camera or the like and automatically display them in a sequence, each for a specified time period, such as five seconds, for example. Some of the slide show functions are slide show functions with background music (BGM) that play back specified music during the slide show display.

In Japanese Patent Application Publication No. JP-A-2006-86622, an information processing device is disclosed that is equipped with this sort of slide show function. The information processing device that is described in Japanese Patent Application Publication No. JP-A-2006-86622 internally stores the still images that have been captured by a digital camera or the like and recorded tracks that serve as the BGM. The information processing device automatically displays the still images in a sequence on a television receiver to which it is connected by a cable, while playing back a track that is selected by a user as the BGM.

Moreover, in recent years, it has become possible for the user to configure a home network by freely combining various types of devices at home and to enjoy content by sharing it among a plurality of the devices. In an environment where this sort of home network has been configured, a need exists to be able to take image content and music content that are stored in a DVD recorder, for example, and by operating a separate device, such as a mobile telephone or the like, display a slide show with BGM on a television receiver.

In a case where a slide show with BGM is implemented in a known home network environment by using a separate device to operate on content that is stored in another device, a method that uses a function such as Universal Plug and Play (UPnP) or the like is conceivable.

Specifications have also been established for making coordination among devices simpler, based on existing standards such as UpnP and the like. These specifications are called the Digital Living Network Alliance (DLNA) Guidelines, and as long as the devices are compatible with the DLNA Guidelines, the content can easily be utilized among a plurality of the devices without requiring the user to make any complex settings or the like.

SUMMARY OF THE INVENTION

However, a problem exists in that no specifications are prescribed in the current DLNA Guidelines for handling a plurality of types of content (image content and music content) simultaneously as in the slide show with BGM. On the other hand, in a case where the slide show function with BGM is implemented by combining functions of UpnP, which forms the basis for the DLNA Guidelines, a problem arises in that the procedures for making settings and the like become extremely complicated.

Accordingly, the present invention addresses the issues described above and provides a slide show display system with BGM, a slide show display method with BGM, an information processing device, a playback device, and programs that are new and improved and are capable of implementing the slide show function with BGM using a simple procedure that coordinates at least three devices.

According to an embodiment of the present invention, there is provided a slide show display system with BGM that includes at least one content provision device that stores at least one of image content and music content and provides at least one of the image content and the music content, a playback device that plays back the image content and the music content, and an information processing device that displays a slide show with BGM on the playback device, using image content and music content that are selected for playback from the image content and the music content that are stored in the at least one content provision device. The information processing device includes a playback selection input portion, a content information notification portion, and a playback request portion. The playback selection input portion inputs information on at least one of the image content and at least one of the music content that are selected for playback. The content information notification portion transmits image content information that pertains to the at least one of the selected image content and music content information that pertains to the at least one of the selected music content to the playback device. The playback request portion makes a playback request to the playback device to play back the image content and the music content that have been selected for playback. The playback device includes a content acquisition portion and a content playback portion. The content acquisition portion acquires the image content and the music content that are selected for playback from the at least one content provision device, based on the image content information and the music content information that are transmitted from the information processing device. In response to the playback request from the information processing device, the content playback portion displays the acquired image content sequentially and plays back the acquired music content.

The content information notification portion may also transmit to the playback device at least one item of the image content information that respectively pertains to the at least one of the image content that is selected for playback, with the image content information being transmitted sequentially in the order in which the image content is played back.

The content information notification portion may also transmit the image content information that corresponds to the image content that will be played back soonest and may also transmit the image content information that corresponds to the image content that will be played back following the image content that will be played back soonest.

The content information notification portion may also transmit to the playback device, as the image content information, information that pertains to a storage site in which the at least one of the image content that is selected for playback is stored.

The content information notification portion may also transmit to the playback device a music list that includes at least one item of the music content information that respectively pertains to the at least one of the music content that is selected for playback.

The playback device may also designate a maximum number of items of the music content information that are included in the music list.

The content information notification portion may also transmit the music list together with the image content information that corresponds to the image content that will be played back first.

The content information notification portion may also transmit to the playback device, as the music content information, information that pertains to a storage site in which the at least one of the music content that is selected for playback is stored.

In a case where the music content information is transmitted from the content information notification portion of the information processing device while the image content and the music content are being played back by the content playback portion, the content acquisition portion of the playback device may also acquire the music content based on the transmitted music content information. The content playback portion may also play back the acquired music content.

According to another embodiment of the present invention, there is provided a slide show display method with BGM for a slide show display system with BGM that includes at least one content provision device that stores at least one of image content and music content and provides at least one of the image content and the music content, a playback device that plays back the image content and the music content, and an information processing device that displays a slide show with BGM on the playback device, using image content and music content that are selected for playback from the image content and the music content that are stored in the content provision device. The method includes a step of inputting, in the information processing device, information on at least one of the image content and at least one of the music content that are selected for playback. The method also includes a step of transmitting to the playback device, by the information processing device, image content information that pertains to the at least one of the selected image content and music content information that pertains to the at least one of the selected music content. The method also includes a step of making a playback request to the playback device, by the information processing device, to play back the image content and the music content that have been selected for playback. The method also includes a step of acquiring, by the playback device and from the at least one content provision device, the image content and the music content that are selected for playback, based on the image content information and the music content information that are transmitted from the information processing device. The method also includes a step of displaying the acquired image content sequentially and playing back the acquired music content, by the playback device in response to the playback request from the information processing device.

According to another embodiment of the present invention, there is provided an information processing device that displays a slide show with BGM on a playback device, using image content and music content that are provided by at least one content provision device in which at least one of the image content and the music content are stored. The information processing device includes a playback selection input portion, a content information notification portion, and a playback request portion. The playback selection input portion inputs information on at least one of the image content and at least one of the music content that are selected for playback. The content information notification portion transmits image content information that pertains to the at least one of the selected image content and music content information that pertains to the at least one of the selected music content to the playback device. The playback request portion makes a playback request to the playback device to play back the image content and the music content that have been selected for playback.

According to another embodiment of the present invention, there is provided a playback device that displays a slide show with BGM by playing back, based on control by an information processing device, image content and music content that are provided by at least one content provision device in which at least one of the image content and the music content are stored. The playback device includes a content acquisition portion and a content playback portion. The content acquisition portion acquires, from the at least one content provision device, the image content and the music content that are selected for playback, based on image content information that pertains to at least one of the selected image content and music content information that pertains to at least one of the selected music content, the image content information and the music content information being transmitted from the information processing device. In response to a playback request from the information processing device, the content playback portion displays the acquired image content sequentially and plays back the acquired music content.

According to another embodiment of the present invention, there is provided a program that causes a computer to function as an information processing that displays a slide show with BGM on a playback device, using image content and music content that are provided by at least one content provision device in which at least one of the image content and the music content are stored. The information processing device includes a playback selection input portion, a content information notification portion, and a playback request portion. The playback selection input portion inputs information on at least one of the image content and at least one of the music content that are selected for playback. The content information notification portion transmits image content information that pertains to the at least one of the selected image content and music content information that pertains to the at least one of the selected music content to the playback device. The playback request portion makes a playback request to the playback device to play back the image content and the music content that have been selected for playback.

According to another embodiment of the present invention, there is provided a program that causes a computer to function as a playback device that displays a slide show with BGM by playing back, based on control by an information processing device, image content and music content that are provided by at least one content provision device in which at least one of the image content and the music content are stored. The playback device includes a content acquisition portion and a content playback portion. The content acquisition portion acquires, from the at least one content provision device, the image content and the music content that are selected for playback, based on image content information that pertains to at least one of the selected image content and music content information that pertains to at least one of the selected music content, the image content information and the music content information being transmitted from the information processing device. In response to a playback request from the information processing device, the content playback portion displays the acquired image content sequentially and plays back the acquired music content.

According to the embodiments of the present invention as described above, it is possible to implement the slide show function with BGM using a simple procedure that coordinates at least three devices.

DETAILED DESCRIPTION OF THE PREFERRED EMBODIMENTS

Figure 1:
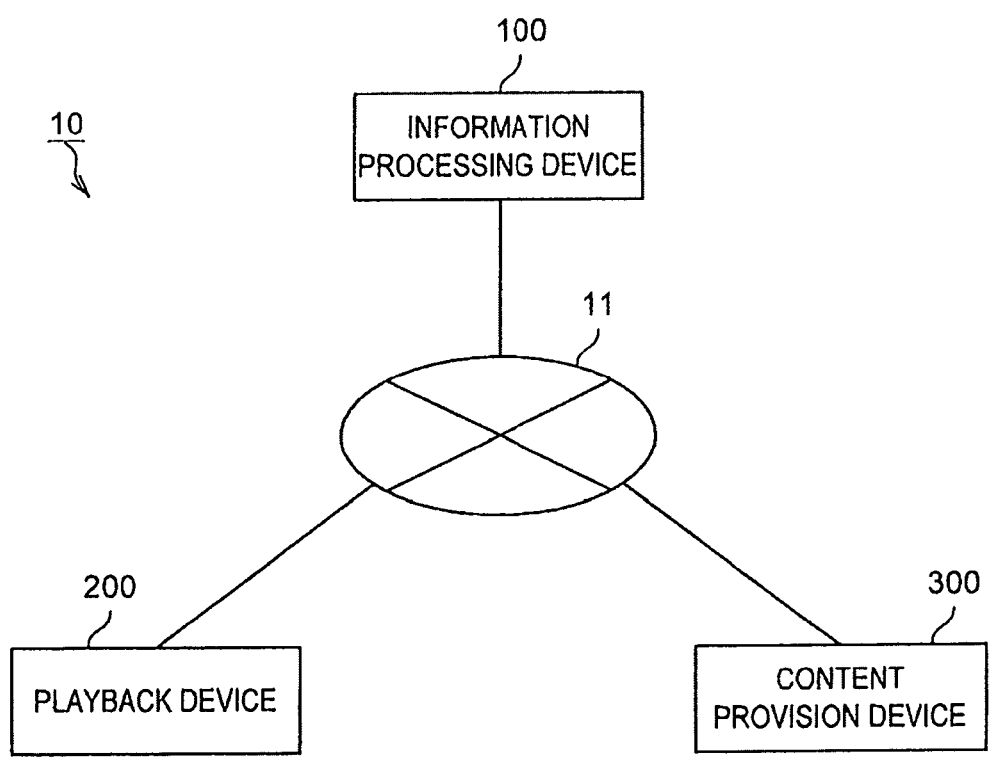
FIG. 1 is a block diagram that shows a schematic configuration of a slide show display system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Configuration of Slide Show Display System with BGM

First, a configuration of a slide show display system with BGM according to an embodiment of the present invention will be explained with reference to FIG. 1. FIG. 1 is a block diagram that shows a schematic configuration of a slide show display system with BGM 10 according to the embodiment of the present invention. As shown in FIG. 1, the slide show display system with BGM 10 is configured such that it includes an information processing device 100, a playback device. 200, and a content provision device 300. The devices are all interconnected through a home network 11.

Information Processing Device 100

The information processing device 100 is provided with a user interface for selecting image and music content that is stored in the content provision device 300 and for causing content to be played back on the playback device 200. The information processing device 100 may be, for example, a device such as a personal computer, a mobile telephone, a mobile information terminal (a personal digital assistant (PDA)), a portable game device, a portable music player, or the like. For the purposes of the explanation below, it is assumed that the image processing device 100 is a mobile telephone.

Figure 2:
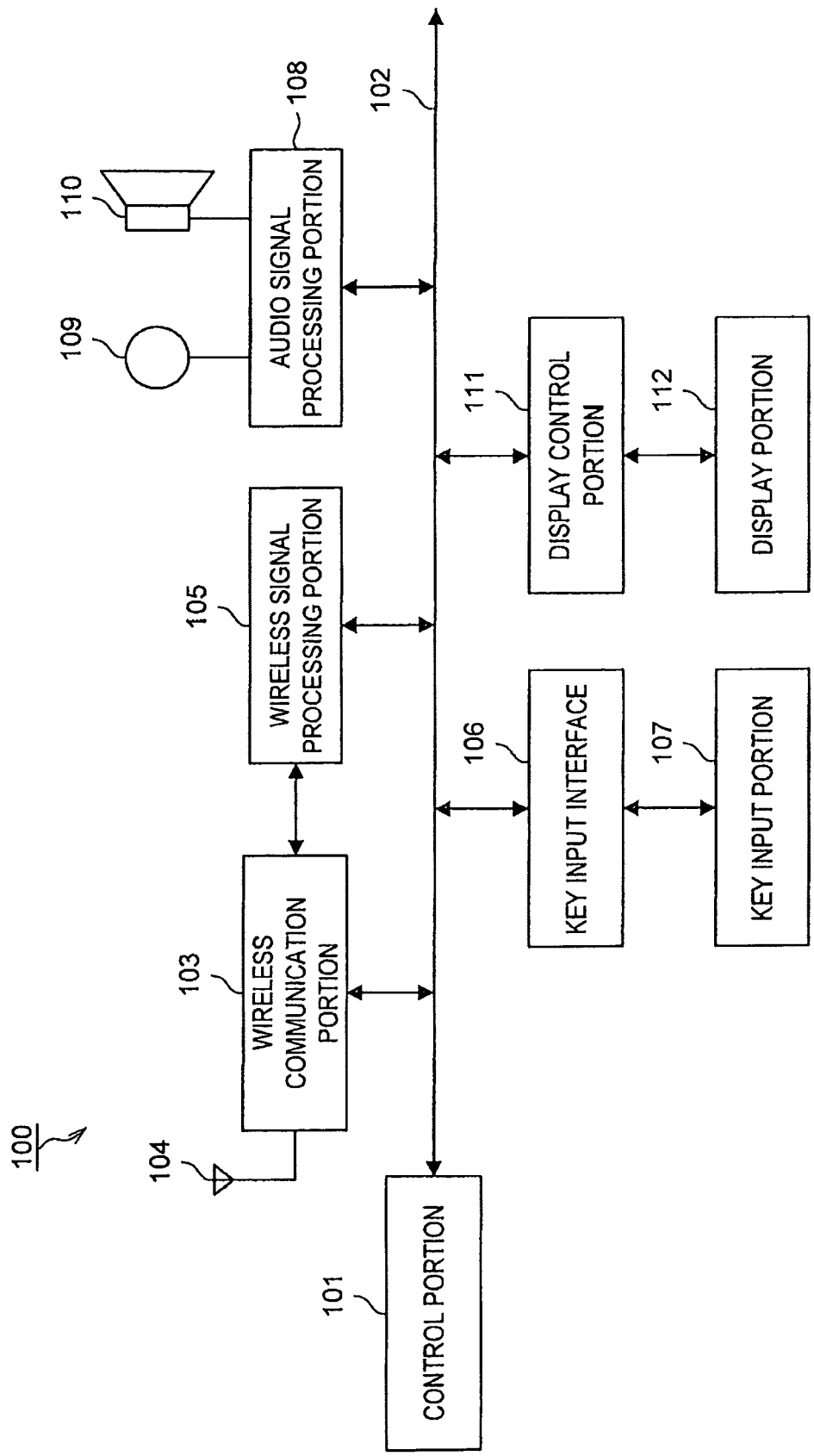
FIG. 2 is a block diagram that shows an example of a configuration of an information processing device according to the embodiment of the present invention.

FIG. 2 is a block diagram that shows an example of a configuration of the information processing device 100. As shown in FIG. 2, the information processing device 100 is configured such that it includes a control portion 101, a bus 102, a wireless communication portion 103, an antenna 104, a wireless signal processing portion 105, a key input interface 106, a key input portion 107, an audio signal processing portion 108, a microphone 109, a speaker 110, a display control portion 111, and a display portion 112.

The control portion 101 is configured such that it includes a microcomputer that contains a central processing unit (CPU), a read only memory (ROM), a random access memory (RAM), a flash memory, and the like. In the control portion 101, the CPU executes a program that is stored in the ROM or the like, causing various types of control signals that are generated to be supplied to the various portions of the information processing device 100 through the bus 102 such that the control portion 101 performs overall control of the information processing device 100.

The wireless communication portion 103 transmits and receives audio signals and data wirelessly through the antenna 104. Through the wireless communication portion 103, the information processing device 100 communicates with other devices in the home network 11, such as the playback device 200, the content provision 300, and the like. The wireless signal processing portion 105 is connected to the wireless communication portion 103 and performs processing that is necessary for wireless communication, such as demodulating audio signals and data signals that are received by the wireless communication portion 103, modulating audio signals and data signals that will be transmitted, inputting the modulated signals to the wireless communication portion 103, and the like.

The key input portion 107 includes a plurality of keys, such as a ten-key pad for inputting telephone numbers and the like, a power supply key for turning the power supply on and off, a call start key for starting to call, a cursor key for moving a cursor that is displayed on the display portion 112, and the like.

The key input interface 106 is connected to the key input portion 107 and transmits to the control portion 101 an operation signal that is generated by an operation of the various types of keys that are provided in the key input portion 107. Based on the operation signal that is input from the key input interface 106, the control portion 101 determines what sort of operation is to be performed and performs control processing accordingly.

The microphone 109 and the speaker 110 respectively input and output audio when the user makes a call using the information processing device 100. The audio signal processing portion 108 encodes an audio signal that is input from the microphone 109, decodes an audio signal that is input from the wireless signal processing portion 105, and outputs the decoded signals from the speaker 110.

The display portion 112 is a display device that is configured from a liquid crystal display or the like. The display control portion 111 is controlled by the control portion 101 and displays on the display portion 112 data that is received by the wireless communication portion 103 and data that is read out from a storage medium such as the flash memory, a memory card, or the like.

The example of the configuration of the information processing device 100 according to the present embodiment has been explained.

Figure 3:
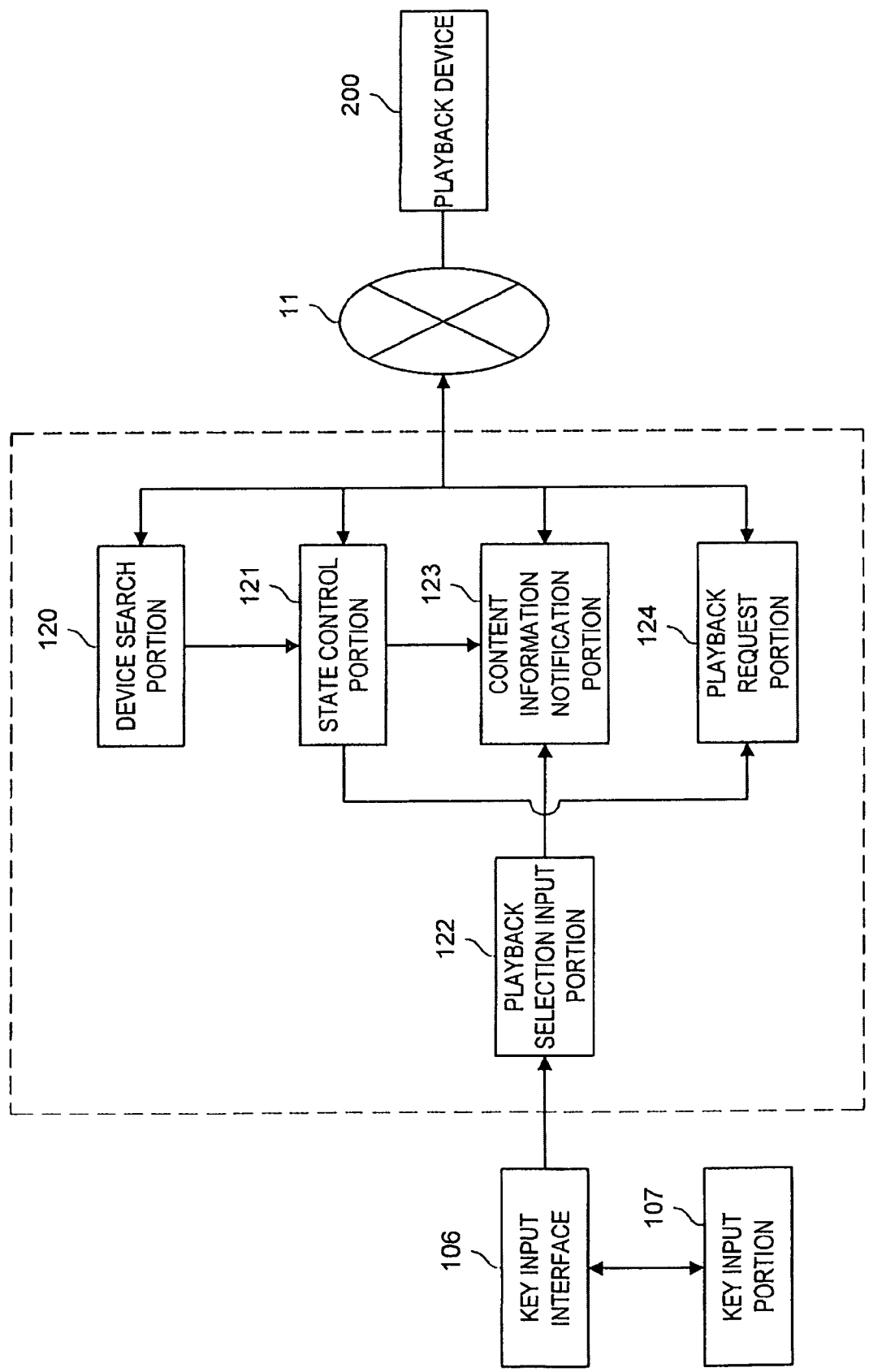
FIG. 3 is a block diagram that shows an example of a functional configuration of the information processing device according to the embodiment of the present invention.

Next, a slide show display function with BGM of the information processing device 100 will be explained with reference to FIG. 3. FIG. 3 is a block diagram that shows an example of a functional configuration of the information processing device 100 for implementing the slide show display function with BGM. As shown in FIG. 3, the information processing device 100 is configured such that it includes a device search portion 120, a state control portion 121, a playback selection input portion 122, a content information notification portion 123, and a playback request portion 124.

Note that the various functional portions that are shown in FIG. 3 can be operated by the CPU that is included in the control portion 101 and may be implemented as at least one of a software program and dedicated hardware that perform the functions of the various portions. The software program may be stored in a computer-readable storage medium such as the ROM, the flash memory, and the like that are included in the control portion 101 and may also be provided to the information processing device 100 through a network.

The device search portion 120, through the wireless communication portion 103, searches for other devices that are connected to the home network 11, such as the playback device 200, for example. In performing the device search, the device search portion 120 may also use the UPnP device search function (M-SEARCH request) or the like. The device search portion 120 acquires device information on the device it locates. The device information (device description and service description) includes information on the device, such as an ID, a name, a type, a list of services, a list of service actions that can be controlled, and the like, for example. Based on the acquired information, the device search portion 120 determines whether or not the located device is a device that is capable of displaying a slide show with BGM.

The state control portion 121 controls a state of the playback device 200. The state of the playback device 200 may be, for example, a state of playing back content, a state o the playback being stopped, a state of the content to be played back being set, and the like. Before transmitting content information to the playback device 200 and requesting that the content be played back, the state control portion 121 checks the state of the playback device 200 and checks whether or not it is a state in which processing is possible.

For example, the state control portion 121 may use the UPnP AV Transport Service (AVT:GetTransportState, AVT:GetPositionInfo, AVT:GetMediaInfo, and the like) to carry out the checking of the state. In a case where the result of the checking of the state of the playback device 200 is not a state in which processing is possible, the information processing device 100 may terminate the slide show display processing. Alternatively, the information processing device 100 may also wait until the playback device 200 enters a state in which processing is possible, and may also set a limit on the waiting time.

The playback selection input portion 122 performs processing to select content to play back as the slide show with BGM from image content and music content that are stored in the content provision device 300. The playback selection input portion 122 may also be configured such that it displays on the display portion 112 a list of the image content and the music content that are stored in the content provision device 300 and makes it possible for the user to select the content for playback from the list. Alternatively, the playback selection input portion 122 may also be configured such that the content for playback is automatically selected in the information processing device 100.

The playback selection input portion 122 also receives an operation signal that is input by the user's operating of a key that is provided in the key input portion 107. Based on the operation signal, the playback selection input portion 122 determines what content has been selected for playback. The content information that is selected for playback is transmitted from the playback selection input portion 122 to the content information notification portion 123.

The content information notification portion 123 takes the content information (the image and music content) that was selected in the playback selection input portion 122 and transmits it to the playback device 200 that was located by the device search portion 120. The designated content is set for playback in the playback device 200.

For example, the content information notification portion 123 may be configured such that it uses the UPnP AV Transport Service (AVT:SetAVTransportURI, AVT:SetNextAVTransportURI, and the like) to transmit the content information. The content information that is transmitted may be, for example, a Uniform Resource Identifier (URI) for the image content that will be displayed as the slide show, a list of the music content that will be played back as BGM, a URI for a container that contains one of image content and music content, and the like.

The playback request portion 124 makes a content playback request to the playback device 200 to which the content information has been transmitted by the content information notification portion 123 and controls the playback device 200 such that the slide show with BGM is displayed. The playback request portion 124 may also be configured such that it uses the UPnP AV Transport Service (AVT:Play and the like) to make the playback request to the playback device 200.

The example of the functional configuration of the information processing device 100 has been explained.

Playback Device 200

The playback device 200 has functions that receive the image and music content from the content provision device 300 under the control of the information processing device 100 and display the slide show with BGM on a display. The playback device 200 may be, for example, a device such as a television receiver, a personal computer that includes a display, a mobile telephone, a mobile information terminal (a personal digital assistant (PDA)), a portable game device, or the like. For the purposes of the explanation below, it is assumed that the playback device 200 is a television receiver.

Figure 4:
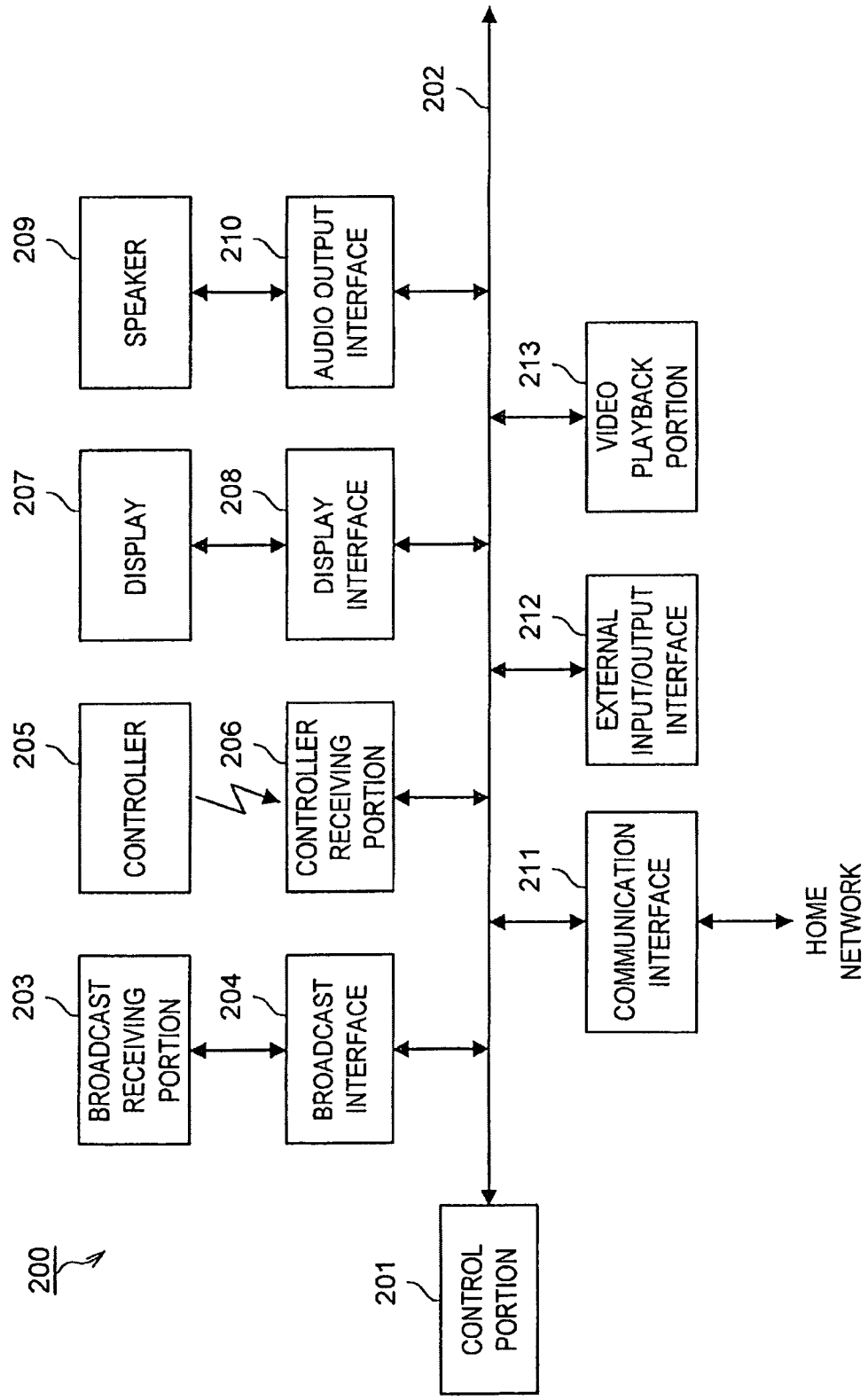
FIG. 4 is a block diagram that shows an example of a configuration of a playback device according to the embodiment of the present invention.

An example of a configuration of the playback device 200 will be explained with reference to FIG. 4. FIG. 4 is a block diagram that shows a schematic configuration of the playback device 200. As shown in FIG. 4, the playback device 200 is configured such that it includes a control portion 201, a bus 202, a broadcast receiving portion 203, a broadcast interface 204, a controller receiving portion 206, a display 207, a display interface 208, a speaker 209, an audio output interface 210, a communication interface 211, an external input/output interface 212, and a video playback portion 213.

The various portions of the playback device 200 will be explained below.

The control portion 201 is configured such that it includes a microcomputer that contains a central processing unit (CPU), a read only memory (ROM), a random access memory (RAM), a flash memory, and the like. In the control portion 201, the CPU executes a program that is stored in the ROM or the like, causing various types of control signals that are generated to be supplied to the various portions of the playback device 200 through the bus 202 such that the control portion 201 performs overall control of the playback device 200.

The broadcast receiving portion 203 receives television program content through at least one of a receiving antenna and a video distribution IP network and passes the program content to the bus 202 through the broadcast interface 204. The controller receiving portion 206 receives a command signal that is transmitted by infrared light or the like from a controller 205 that is operated by the user. The received command signal is transmitted from the controller receiving portion 206 to the control portion 201 through the bus 202.

The display 207 is a display device for displaying images of moving image and still image content that are played back by the video playback portion 213. The display 207 displays images that are input through the display interface 208. The speaker 209 is an output device for outputting audio, and it outputs, through the audio output interface 210, audio that is input to it.

The communication interface 211 is an interface for performing communication with another device that is connected to the playback device 200 through a network such as the Internet, the home network 11, or the like.

The external input/output interface 212 is an interface for connecting a device such as a digital recorder, a digital camera, or the like to the playback device 200. It is also an interface for inputting images and sound that are output from the digital recorder, the digital camera, or the like and outputting program content and the like that has been received by the playback device 200.

The video playback portion 213 performs processing for playing back, as video, the program content that is received by the broadcast receiving portion 203. The video playback portion 213 takes a packet of program content that the broadcast receiving portion 203 has received through a video distribution IP network, for example, and separates the packet into distinct signals for audio, video, data, and the like. The video playback portion 213 then decodes the separated signals. The decoded video signal is output to the display 207 through the display interface 208, and the audio signal is output from the speaker 209 through the audio output interface 210.

The example of the configuration of the playback device according to the present embodiment has been explained.

Figure 5:
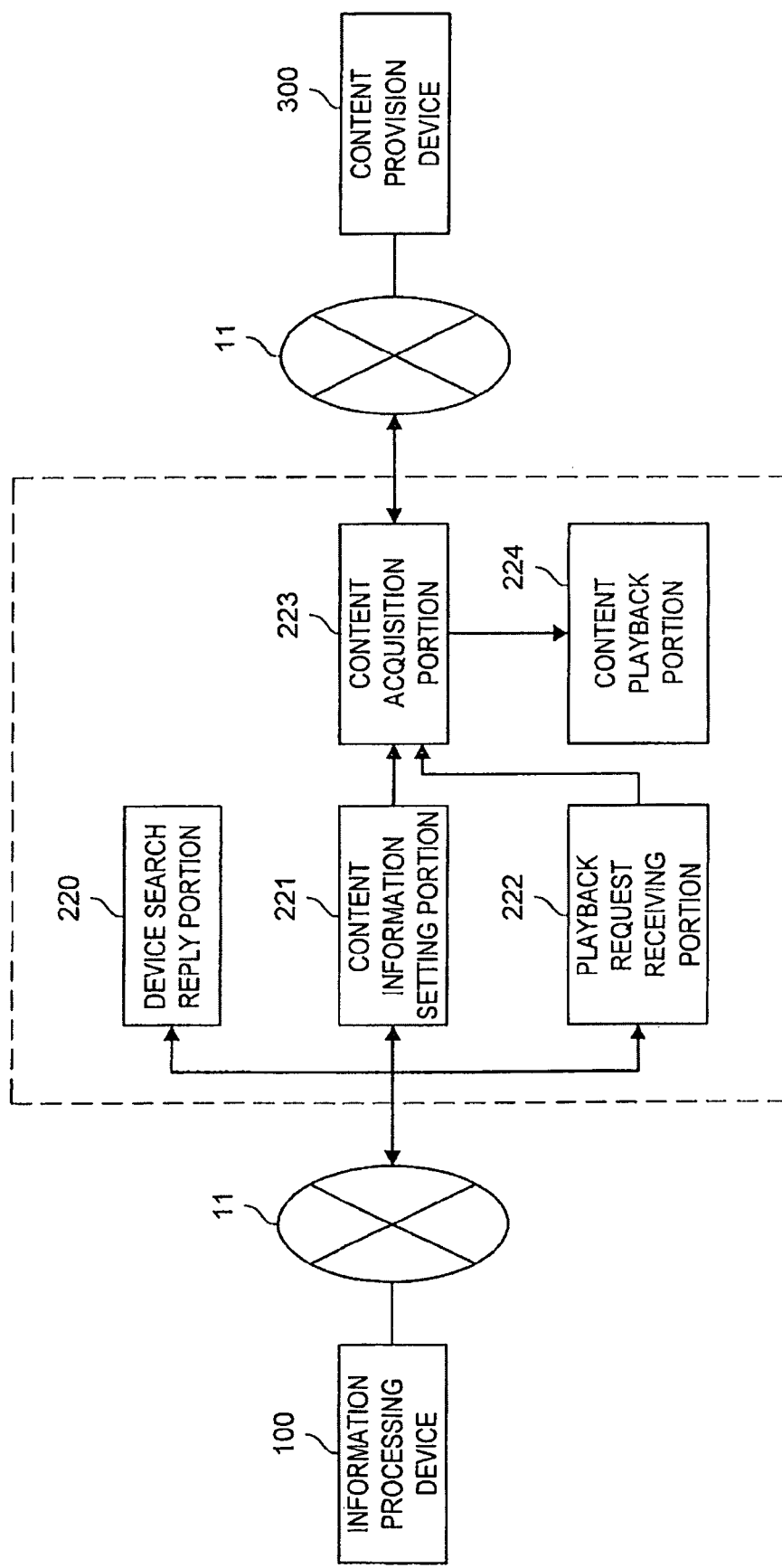
FIG. 5 is a block diagram that shows an example of a functional configuration of the playback device that is shown in FIG. 4.

Next, a slide show display function with BGM of the playback device 200 will be explained with reference to FIG. 5. FIG. 5 is a block diagram that shows an example of a functional configuration of the playback device 200 for implementing the slide show display function with BGM. As shown in FIG. 5, the playback device 200 is configured such that it includes a device search reply portion 220, a content information setting portion 221, a playback request receiving portion 222, a content acquisition portion 223, and a content playback portion 224.

Note that the various functional portions that are shown in FIG. 5 can be operated by the CPU that is included in the control portion 201 and may be implemented as at least one of a software program and dedicated hardware that perform the functions of the various portions. The software program may be stored in a computer-readable storage medium such as the ROM, the flash memory, and the like that are included in the control portion 201 and may also be provided to the playback device 200 through a network.

The device search reply portion 220 replies to a search request (M-SEARCH request) from another device that is connected to the home network 11, such as the information processing device 100, for example. The device search reply portion 220 also transmits the device information (the device description and the service description) for the playback device 200 in response to a device information acquisition request.

The content information setting portion 221 sets content information to be played back based on the content information that is transmitted from the information processing device 100. For example, the content information setting portion 221 uses the AVT:SetAVTransportInfo action to set for playback one of image content and a music list that have been transmitted from the information processing device 100. The content information setting portion 221 also uses the AVT:SetNextAVTransportInfo action to set transmitted image content to be played back next.

The playback request receiving portion 222 receives the playback request (AVT:Play and the like) from the information processing device 100 and commands the content acquisition portion 223 and the like such that the content that is set for playback is played back.

The content acquisition portion 223 acquires image and music content from the content provision device 300 in response to the playback request from the information processing device 100. Using a URI or the like for the content that the content information setting portion 221 has set to be played back, the content acquisition portion 223 acquires the content from the URI that the content provision device 300 has designated.

The content playback portion 224 performs processing that plays the slide show with BGM by playing back the content that has been acquired by the content acquisition portion 223. The content playback portion 224 causes the acquired image content to be displayed on the display 207 and causes the music content to be played back and the sound to be output from the speaker 209. The example of the functional configuration of the playback device 200 has been explained.

Content Provision Device 300

The content provision device 300 contains a storage medium in which the image and music content are stored and has a function that provides the image and music content to a television receiver. The content provision device 300 may be, for example, a device such as a personal computer, a DVD recorder, a digital camera, a music player, or the like. For the purposes of the explanation below, it is assumed that the content provision device 300 is a DVD recorder.

Figure 6:
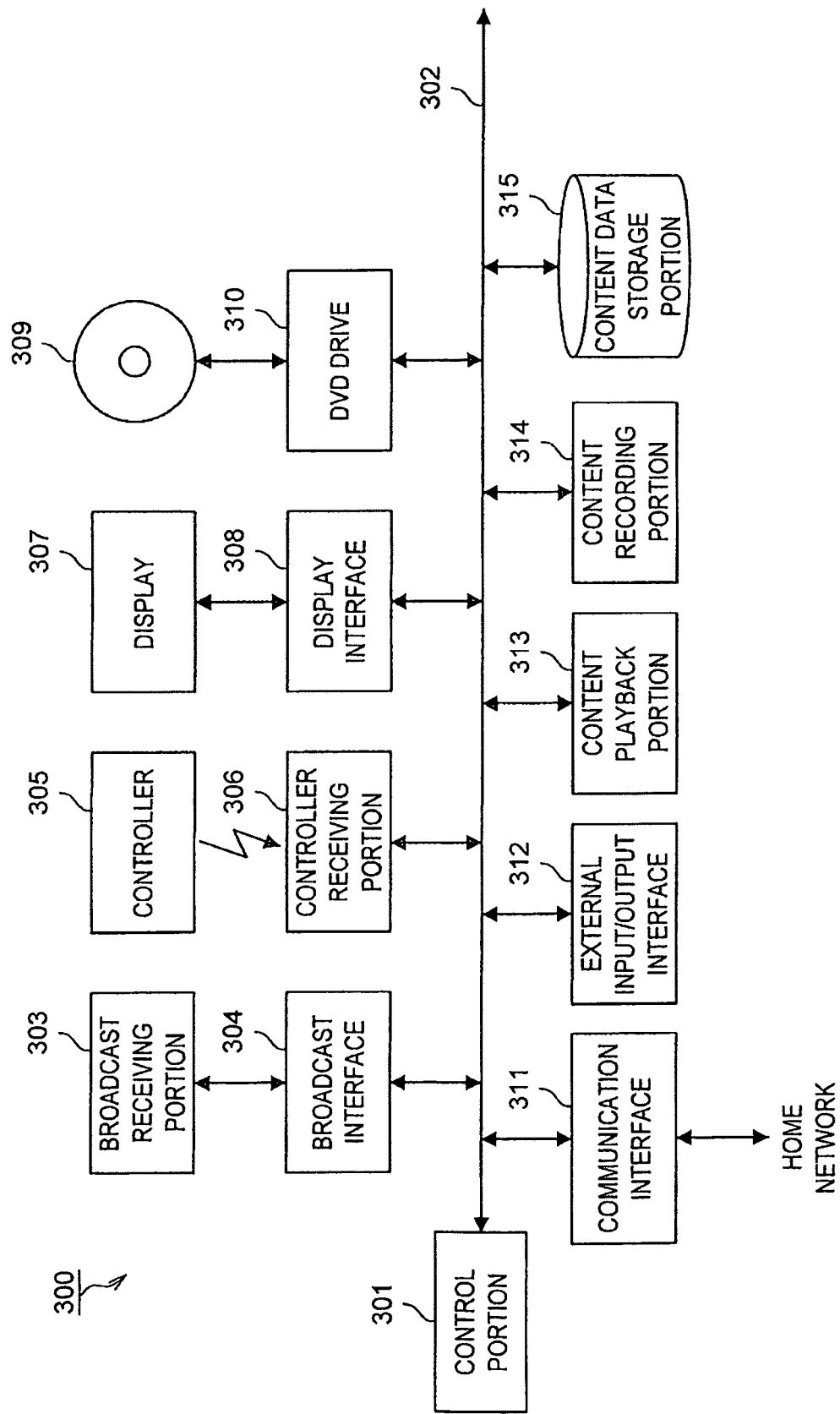
FIG. 6 is a block diagram that shows an example of a configuration of a content provision device according to the embodiment of the present invention.

FIG. 6 is a block diagram that shows an example of a configuration of the content provision device 300. As shown in FIG. 6, the content provision device 300 is configured such that it includes a control portion 301, a bus 302, a broadcast receiving portion 303, a broadcast interface 304, a controller receiving portion 306, a display 307, a display interface 308, a DVD drive 310, a communication interface 311, an external input/output interface 312, and a content playback portion 313, a content recording portion 314, and a content data storage portion 315. The various portions of the content provision device 300 will be explained below.

The control portion 301, the broadcast receiving portion 303, the broadcast interface 304, the controller receiving portion 306, the display 307, the display interface 308, the communication interface 311, and the external input/output interface 312 have the same sorts of functions as their counterparts in the configuration of the playback device 200, so reduplicative explanations will be omitted.

The DVD drive 310 reads and writes data from and to a DVD 309. The data that is read from the DVD 309 can be input to the content playback portion 313 and can be output from the external input/output interface 312 to a display device such as a television receiver or the like.

The content playback portion 313 performs processing (data conversion, encoding/decoding processing, and the like) for playing back the content data that is stored in the DVD 309 and the content data storage portion 315. The content recording portion 314 takes television program content data that has been received by the broadcast receiving portion 303 and performs processing (data conversion, encoding/decoding processing, and the like) to store it in the DVD 309 and the content data storage portion 315.

The content data storage portion 315 is a storage medium that is configured from a hard disk or the like. The television program content data that has been received by the broadcast receiving portion 303 is stored in the content data storage portion 315, as are image data, music data, and the like that are input from the communication interface 311.

The example of the configuration of the content provision device 300 according to the present embodiment has been explained.

Figure 7:
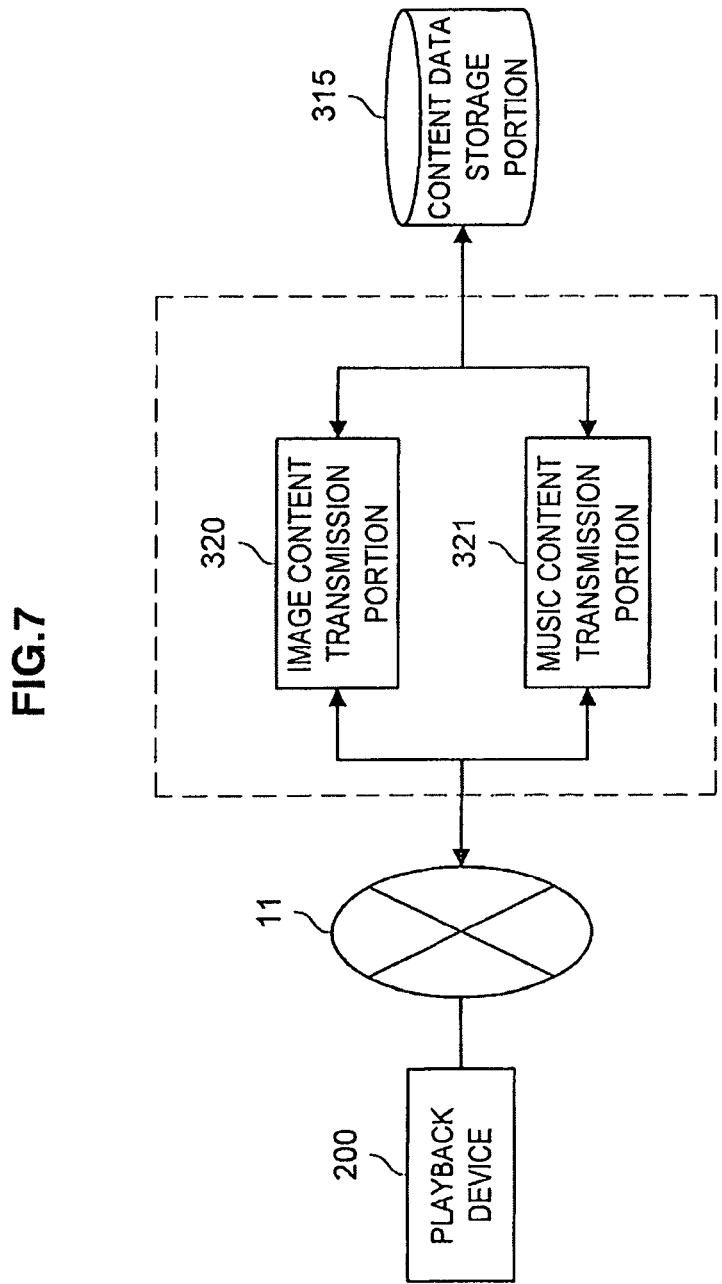
FIG. 7 is a block diagram that shows an example of a functional configuration of the content provision device that is shown in FIG. 6.

Next, a slide show display function with BGM of the content provision device 300 will be explained with reference to FIG. 7. FIG. 7 is a block diagram that shows an example of a functional configuration of the content provision device 300 for implementing the slide show display function with BGM. As shown in FIG. 7, the content provision device 300 is configured such that it includes an image content transmission portion 320 and a music content transmission portion 321.

Note that the various functional portions that are shown in FIG. 7 can be operated by the CPU that is included in the control portion 301 and may be implemented as at least one of a software program and dedicated hardware that perform the functions of the various portions. The software program may be stored in a computer-readable storage medium such as the ROM, the flash memory, and the like that are included in the control portion 301 and may also be provided to the content provision device 300 through a network.

In response to a content acquisition request from the playback device 200, the image content transmission portion 320 and the music content transmission portion 321 respectively transmit, through the communication interface 311, the image content and the music content that are stored in the content data storage portion 315.

An example of the configuration of the slide show display system with BGM 10 according to the embodiment of the present invention has been explained. Different forms of a slide show display method with BGM that is used in the slide show display system with BGM 10 described above will be explained below.

First Form

Figure 8:
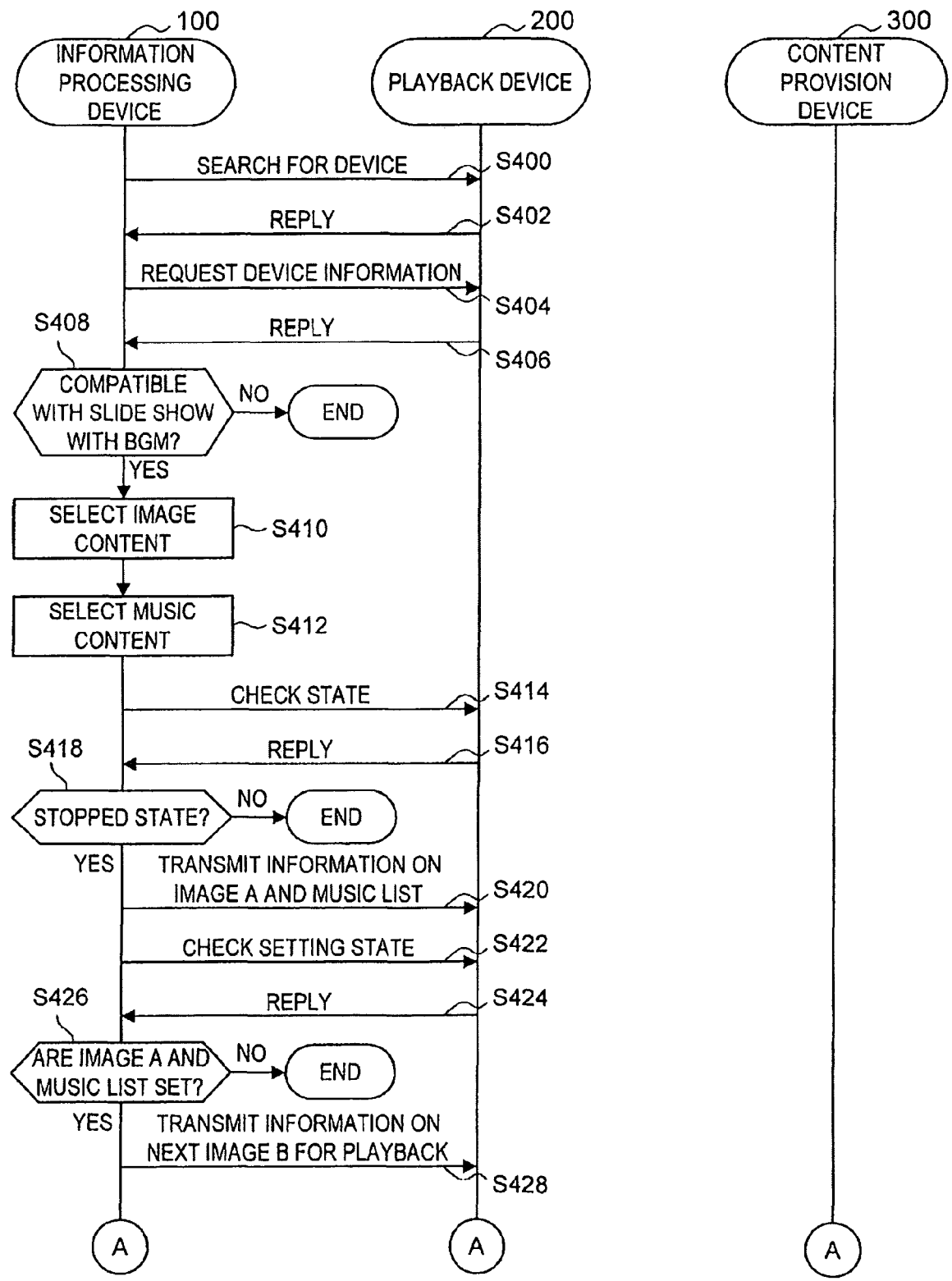
FIG. 8 is a sequence chart that shows a flow of processing by a slide show display method according to a first form of the method.
Figure 9:
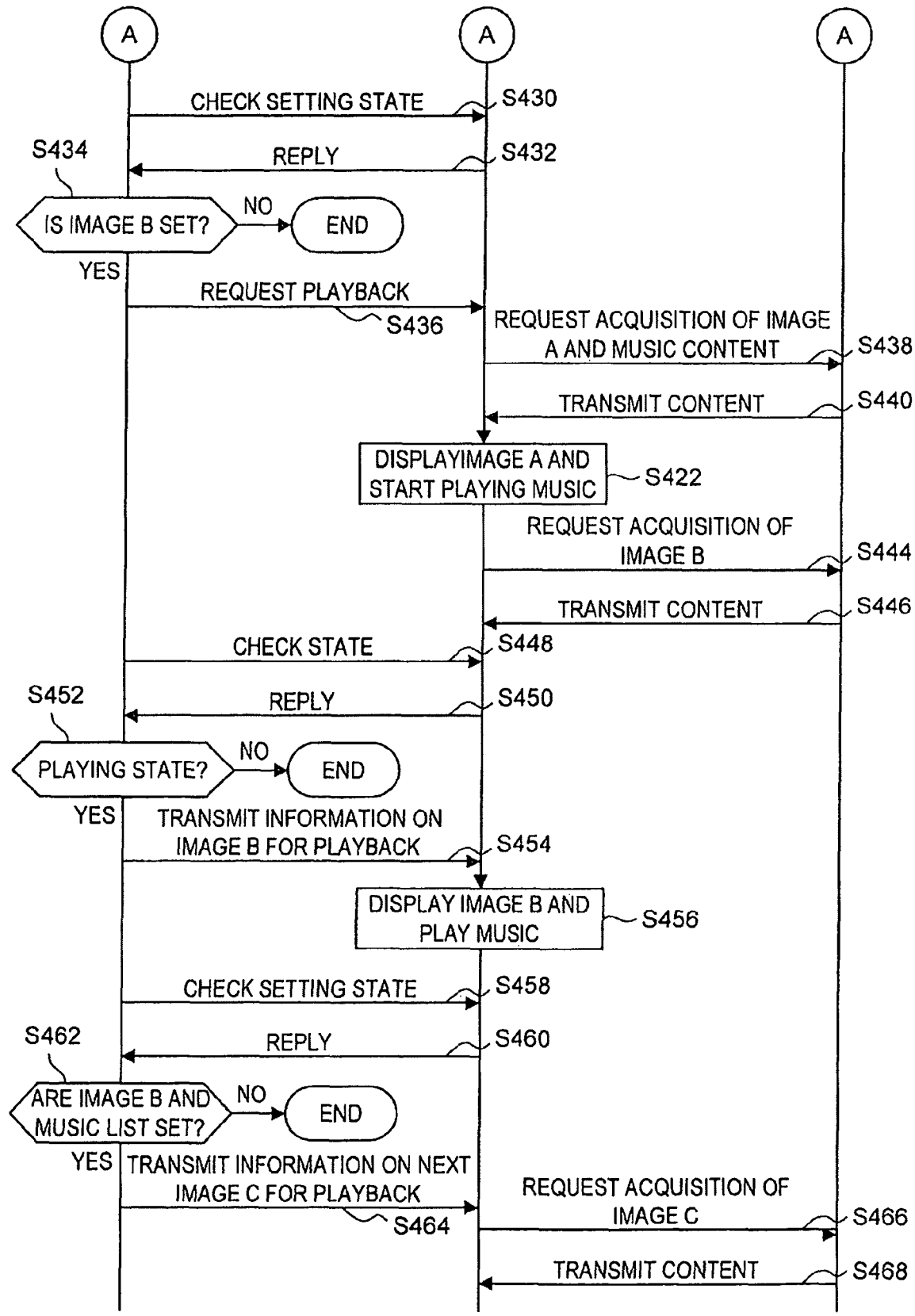
FIG. 9 is a sequence chart that shows a flow of processing by the slide show display method according to the first form of the method.

A slide show display method with BGM according to a first form will be explained with reference to FIGS. 8 and 9. The slide show display method with BGM according to the present form is characterized in that it achieves a continuous display of images by causing the information processing device 100 to transmit continuously to the playback device 200 image content for a plurality of images that are displayed one at a time, in a sequence, as a slide show.

This method provides an advantage in that, unlike a method that transmits the content for a plurality of images in the form of a list, it does not require that an upper limit be set on the number of images. Further, with this method, the information processing device 100 first provides to the playback device 200, in the form of a music list, information on the music content that is played back as BGM. This makes it possible for the music content in the music list to be played back continuously while the image content is being continuously displayed.

First, when a slide show display with BGM is selected by a user operation in the information processing device 100, the device search portion 120 of the information processing device 100 uses the UPnP device search function (M-SEARCH request) or the like to search for the playback device 200 that is connected to the home network 11 (Step S400). The device search reply portion 220 of the playback device 200 replies to the search request from the information processing device 100 (Step S402).

When the reply is received from the playback device 200, the device search portion 120 of the information processing device 100 requests acquisition of the device information (the device description and the service description) from the playback device 200 (Step S404). The device search reply portion 220 of the playback device 200 transmits the device information to the information processing device 100 (Step S406). The device information for the playback device 200 may contain, for example, an ID, a name, a type, a list of services, a list of service actions that can be controlled, an upper limit on the number of music items that can be designated, and the like.

Having received the device information, the device search portion 120 of the information processing device 100 determines, based on the acquired device information, whether or not the playback device 200 is a device that is capable of displaying a slide show with BGM (Step S408). Whether or not the playback device 200 is a device that is capable of displaying a slide show with BGM can be determined, for example, according to whether or not av:X_MaxBGMCount is designated in the device description in the device information.

In a case where it is determined that the slide show with BGM cannot be displayed (No at Step S408), the information processing device 100 one of terminates the processing and searches for a different playback device. In a case where it is determined at Step S408 that it is possible to display the slide show with BGM (Yes at Step S408), the processing continues. The method may also be configured such that, in a case where a plurality of playback devices are located that are capable of displaying the slide show with BGM, the information processing device 100 displays a list of the devices on the display portion 112 such that the playback device can be selected by a user operation.

Next, the image content that will be displayed as the slide show is selected in the information processing device 100 (Step S410). The image content that is selected here is data for images (one of still images and moving images) that are stored in the content provision device 300. The user looks at a list of the images in the content provision device 300 that are displayed in the display portion 112 and selects the image content by operating a key in the key input portion 107.

Information on the selected image content is input to the playback selection input portion 122. Note that the list of the images in the content provision device 300 may be acquired from the communication partner device 300 and stored in the information processing device 100, and it may also be provided from the content provision device 300 based on a request from the information processing device 100.

Next, in the same manner as at Step S410, the music content that will be played back while the slide show is displayed is selected in the information processing device 100 (Step S412). The music content that is selected here is data for music that is stored in the content provision device 300. In a case where the device information that was acquired from the playback device 200 at Step S406 specifies an upper limit on the number of music items that can be designated, the information processing device 100 may also set an upper limit on the number of music items that can be selected.

Next, the state control portion 121 of the information processing device 100 checks the state of the playback device 200 (Step S414). The state that is checked at this point is whether or not content is currently being played back in the playback device 200. The state control portion 121 may use the AVT:GetTransportState action or the like to check the state of the playback device 200. The playback device 200 replies to the check from the information processing device 100 by transmitting its own state to the information processing device 100 (Step S416).

Next, the state control portion 121 of the information processing device 100 determines, based on the reply from the playback device 200, whether or not the playback device 200 is in a state in which the slide show with BGM can be displayed (Step S418). Specifically, the state control portion 121 determines whether or not the playback device 200 is in a stopped state in which nothing is being played back. If the playback device 200 is in the stopped state (Yes at Step S418), the processing proceeds to the next step. If the playback device 200 is not in the stopped state (No at Step S418), the method may be configured such that the information processing device 100 terminates the processing.

Next, the content information notification portion 123 of the information processing device 100 takes information on the image content (hereinafter called the "image A") that will be the first displayed of the images that were selected at Step S410 and a list of the music content that was selected as BGM at Step S412 and transmits them to the playback device 200 (Step S420). The content information notification portion 123 may use, for example, the AVT:SetAVTransportURI action or the like to transmit the URIs for the image A and the music list to the playback device 200. This causes the image A and the music list to be set for playback in the playback device 200.

Next, the state control portion 121 of the information processing device 100 checks whether or not the image A and the music list have been set as the content for playback in the playback device 200 (Step S422). The state control portion 121 may use, for example, the AVT:GetPositionInfo action or the like to check the setting state of the playback device 200.

Once a reply is received from the playback device 200 (Step S424), the state control portion 121 determines whether or not the image A and the music list have been set for playback in the playback device 200, based on the content of the reply (Step S426). In a case where the image A and the music list have not been set for playback (No at Step S426), the method may be configured such that the information processing device 100 terminates the processing. In a case where the image A and the music list have been set for playback (Yes at Step S426), the processing proceeds to the next step.

Next, the content information notification portion 123 of the information processing device 100 transmits to the playback device 200 information on the image content (hereinafter called the "image B") that will be displayed after the image A, such that the image B will be set to be played back next in the playback device 200 (Step S428). The content information notification portion 123 may use the AVT:SetNextAVTransportURI action or the like to transmit the URI for the image B to the playback device 200.

This makes it possible for the information on the image B that will be displayed after the image A to be set in the playback device 200 in advance, and for the image B to be acquired in advance from the content provision device 300. This in turn makes it possible to reduce the effect on the display timing of the time it takes for the playback device 200 to acquire the image B, such that the images can be displayed continuously at fixed intervals.

Next, the state control portion 121 of the information processing device 100 checks whether or not the image B has been set as the image to be displayed next in the playback device 200 (Step S430). The state control portion 121 may use, for example, the AVT:GetMediaInfo action or the like to check the setting state. Once a reply is received from the playback device 200 (Step S432), the state control portion 121 determines whether or not the image B has been set as the image to be displayed next in the playback device 200 (Step S434). In a case where the image B has not been set (No at Step S434), the method may be configured such that the information processing device 100 terminates the processing.

Once it has been confirmed, through the processing at Steps S420 to S434, that the content for playback and the next content to be played back have been set in the playback device 200, the playback request portion 124 of the information processing device 100 requests that the playback device 200 perform the playback processing (Step S436). The playback request portion 124 may use, for example, the AVT:Play action or the like to make the playback request.

Once the playback request has been received from the information processing device 100, the content acquisition portion 223 of the playback device 200 transmits an acquisition request to the content provision device 300 for the content that has been set for playback, that is, the image A and the music content that is included in the music list (Step S438). Once the image A and the music content have been received from the content provision device 300 (Step S440), the content playback portion 224 of the playback device 200 displays the image A on the display 207 and starts the playback of the music content (Step S442).

Next, the content acquisition portion 223 of the playback device 200 acquires from the content provision device 300 the content that has been designated to be played back next, that is, the image B (Steps S444 and S446). This makes it possible to display the image B in sequence after the image A at a predetermined time, without any delay due to the time it takes to acquire the image B.

Next, after the playback request is made, the state control portion 121 of the information processing device 100 performs a check of the state of the playback device 200 in order to check whether or not the slide show display with BGM is currently being performed (Step S448). In the same manner as at Step S414, the state control portion 121 may use the AVT:GetTransportState action or the like to check the state. The playback device 200 replies to the check from the information processing device 100 by transmitting its own state to the information processing device 100 (Step S450).

Next, the state control portion 121 of the information processing device 100 determines, based on the reply from the playback device 200, whether or not the playback device 200 is in a playing state (Step S452). If the playback device 200 is in the playing state (Yes at Step S452), the processing proceeds to the next step. If the playback device 200 is in a state other than the playing state (No at Step S452), the method may be configured such that the information processing device 100 terminates the processing.

Next, the content information notification portion 123 of the information processing device 100 transmits content information on the image B that will be played back following the image A that is currently being played back (Step S454). This causes the content playback portion 224 of the playback device 200 to display the image A on the display 207 (Step S456).

Next, the state control portion 121 of the information processing device 100 checks, in the same manner as at Steps S422 to S426, whether or not the image B and the music list have been set for playback in the playback device 200 (Steps S458 to S462).

Once it has been confirmed at Step S462 that the image B and the music list have been set for playback, the content information notification portion 123 of the information processing device 100 transmits content information on an image C that will be played back next (Step S464). The content information setting portion 221 of the playback device 200 sets the image C to be played back next, and the content acquisition portion 223 transmits an acquisition request for the image C to the content provision device 300 (Step S466). Having received the content acquisition request from the playback device 200, the image content transmission portion 320 of the content provision device 300 transmits the content for the image C (Step S468).

The slide show display method with BGM according to the first form has been explained. The processing procedure described above makes it possible to implement the slide show display function with BGM easily.

Second Form

Figure 10:
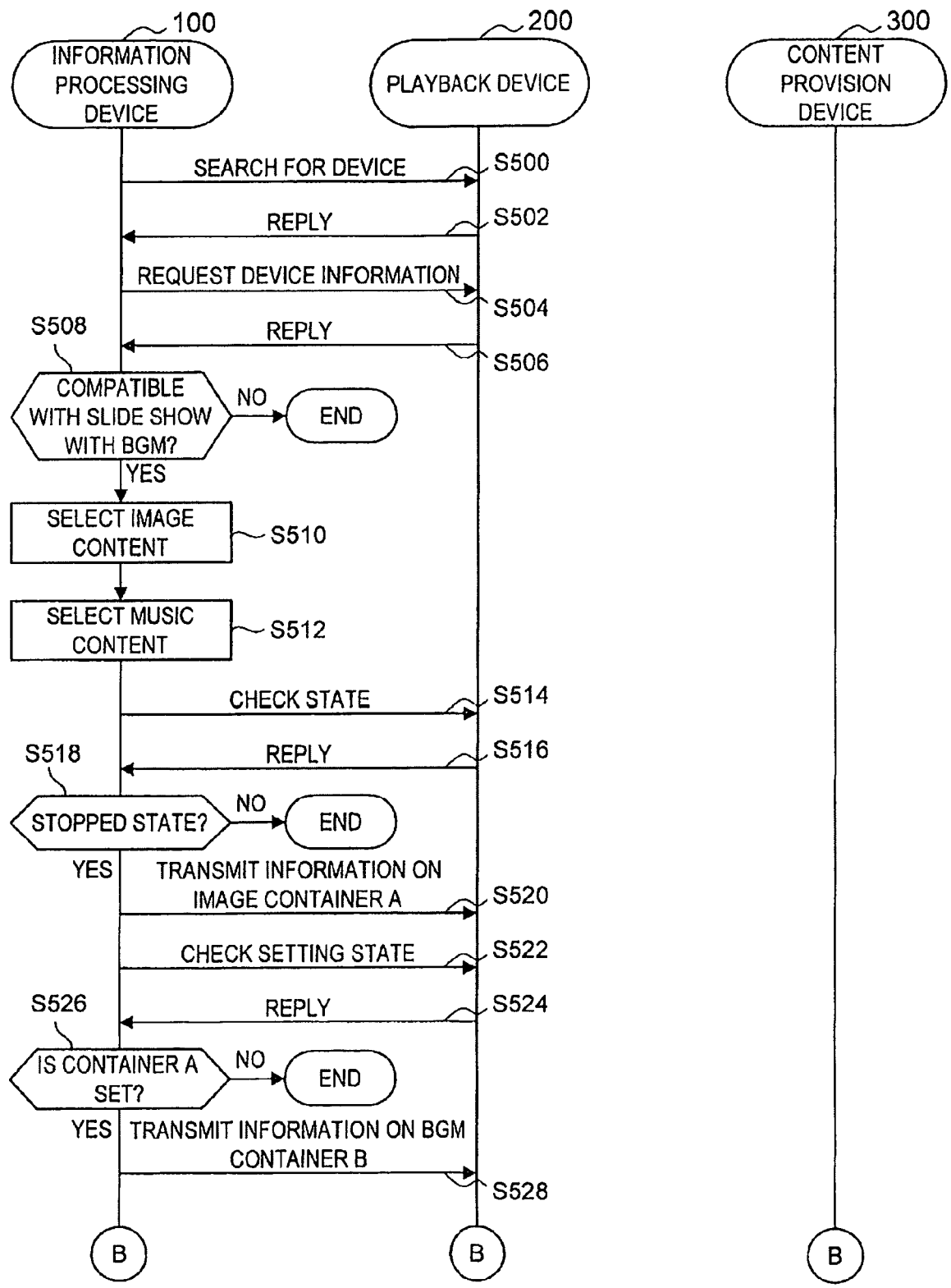
FIG. 10 is a sequence chart that shows a flow of processing by a slide show display method according to a second form of the method.
Figure 11:
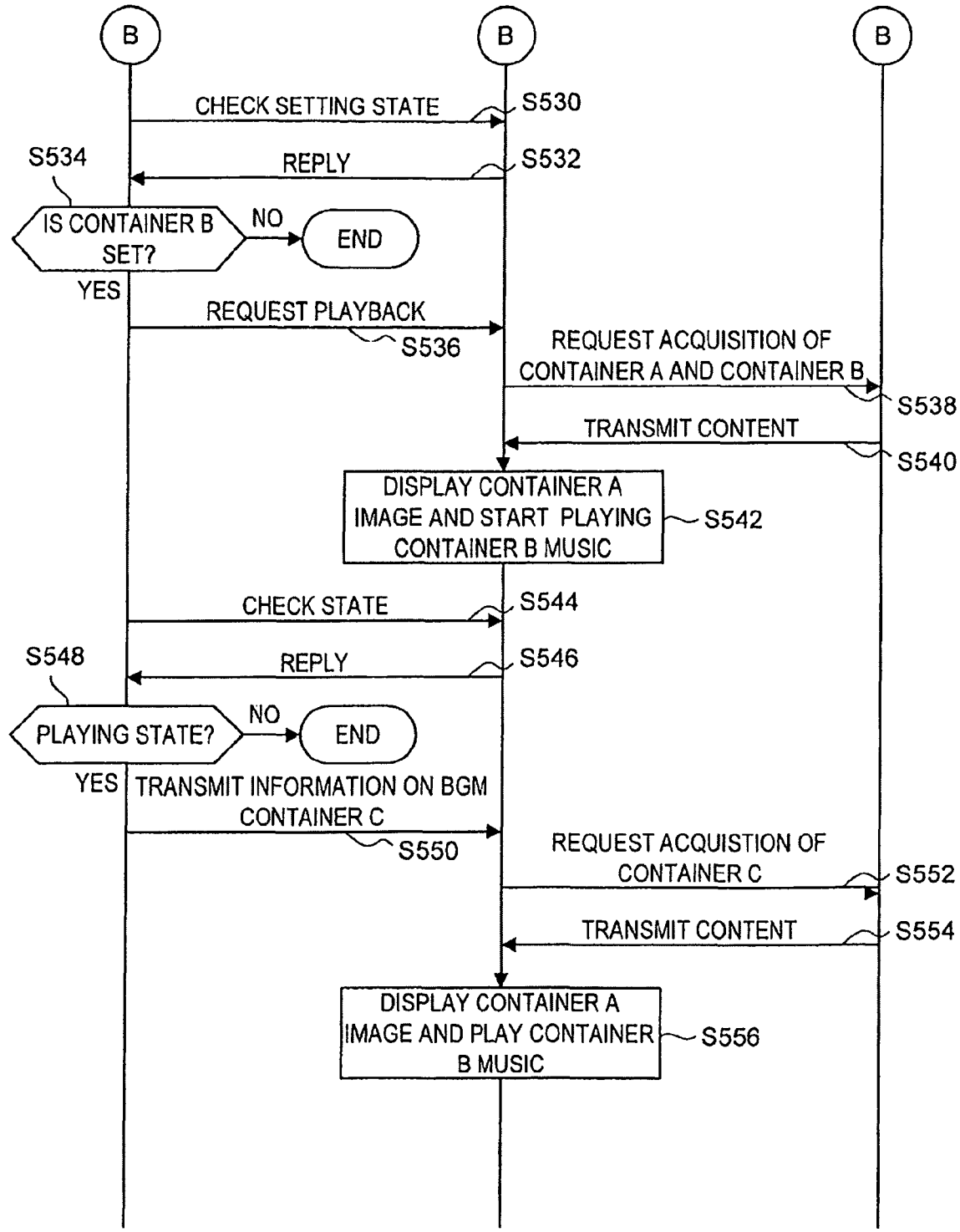
FIG. 11 is a sequence chart that shows a flow of processing by the slide show display method according to the second form of the method.

Next, a slide show display method with BGM according to a second form will be explained with reference to FIGS. 10 and 11. The slide show display method with BGM according to the present form is characterized in that the information processing device 100 transmits to the playback device 200 information that indicates a storage site where at least one of image content and music content is stored, such that the at least one of the image content and the music content that is stored in the storage site is played back continuously. The storage site where the at least one of the image content and the music content is stored is called a container.

This method provides an advantage in that the content for a plurality of images can all be set at the beginning, so the control processing that the information processing device 100 performs is simpler than with the slide show display method with BGM according to the first form. Furthermore, unlike the first form, in which the list of music to be played back as BGM is designated at the beginning, the music content can be added, modified, deleted, and the like during playback.

Note that in the explanation that follows, parts that perform substantially the same processing as in the first form will be abbreviated in order to avoid reduplicative explanations. First, in the same manner as in the first form, the device search portion 120 of the information processing device 100 searches for the playback device 200 that is connected to the home network 11 (Step S500). The device search reply portion 220 of the playback device 200 replies to the search request from the information processing device 100 (Step S502).

Next, the device search portion 120 of the information processing device 100 requests acquisition of the device information (the device description and the service description) from the playback device 200 (Step S504). The device search reply portion 220 of the playback device 200 transmits the device information to the information processing device 100 (Step S506).

Having received the device information, the device search portion 120 of the information processing device 100 determines, based on the acquired device information, whether or not the playback device 200 is a device that is capable of displaying a slide show with BGM (Step S508). Whether or not the playback device 200 is a device that is capable of displaying a slide show with BGM can be determined, for example, according to whether or not the AVT:X_SetBGMURI action is included in the service description in the device information.

In a case where it is determined at Step S508 that it is possible to display the slide show with BGM (Yes at Step S508), the image content that will be displayed as the slide show and the music content that will be played back as BGM are selected in the information processing device 100 (Steps S510 and S512). In this case, the image content and the music content are selected by designating the container in which the content is contained, and the content that is contained in the selected container is played back continuously in order. For the purposes of this explanation, the selected image content container is called container A, and the container for the music content is called container B.

Next, the state control portion 121 of the information processing device 100 uses the AVT:GetTransportState action or the like to check whether or not the playback device 200 is in a stopped state (Step S514). The playback device 200 replies to the check from the information processing device 100 by transmitting its own state to the information processing device 100 (Step S516).

Next, the state control portion 121 of the information processing device 100 determines whether or not the playback device 200 is in the stopped state (Step S518), and if it is in a stopped state, the processing may be terminated.

Next, the content information notification portion 123 of the information processing device 100 transmits to the playback device 200 information on the image content container A that was selected at Step S510 (Step S520). The content information notification portion 123 may use, for example, the AVT:SetAVTransportURI action or the like to transmit the URI for the image content container A to the playback device 200. This causes the image content container A to be set for playback in the playback device 200.

Next, the state control portion 121 of the information processing device 100 checks whether or not the container A has been set as the content for playback in the playback device 200 (Steps S522 to S526). The state control portion 121 may use, for example, the AVT:GetPositionInfo action or the like to check the setting state of the playback device 200. In a case where the container A has not been set for playback (No at Step S526), the method may be configured such that the information processing device 100 terminates the processing. In a case where the container A has been set for playback (Yes at Step S526), the processing proceeds to the next step.

Next, the content information notification portion 123 of the information processing device 100 transmits to the playback device 200 information on the container B for the music content that will be played back as BGM (Step S528). The content information notification portion 123 may use the AVT:X_SetBGMURI action or the like to transmit the URI for the container B to the playback device 200. Next, the state control portion 121 of the information processing device 100 checks whether or not the container B has been set for playback as BGM in the playback device 200 (Steps S530 to S534). The method may be configured such that the state control portion 121 may use the AVT:X_GetBGMURI action or the like to check whether the designated container B has been set for playback as BGM.

Once it has been confirmed, through the processing at Steps S520 to S534, that the container A for the image content that is to be played back and the container B for the music content that is to be played back as BGM have both been set in the playback device 200, the playback request portion 124 of the information processing device 100 requests that the playback device 200 perform the playback processing (Step S536). The playback request portion 124 may use, for example, the AVT:Play action or the like to make the playback request.

Once the playback request has been received from the information processing device 100, the content acquisition portion 223 of the playback device 200 transmits acquisition requests to the content provision device 300 for the image content and the music content, respectively in the container A and the container B that have been designated for playback, based on the URIs for the container A and the container B (Step S538). Once the image content and the music content have been received from the content provision device 300 (Step S540), the content playback portion 224 of the playback device 200 displays the acquired image content sequentially on the display 207 and starts the playback of the music content (Step S542).

Next, after the playback request is made, the state control portion 121 of the information processing device 100 performs a check of the state of the playback device 200 in order to check whether or not the slide show display with BGM is currently being performed (Step S544). In the same manner as at Step S514, the state control portion 121 may use the AVT:GetTransportState action or the like to check the state. The playback device 200 replies to the check from the information processing device 100 by transmitting its own state to the information processing device 100 (Step S546). Then the state control portion 121 determines whether or not the playback device 200 is in a playing state (Step S548).

In a case where the BGM will be changed while the slide show with BGM is being displayed, the content information notification portion 123 of the information processing device 100 transmits to the playback device 200, in the same manner as at Step S528, information on a container C for the music content that will be played back as the new BGM (Step S550). As at Step S528, the content information notification portion 123 may use the AVT:X_SetBGMURI action or the like to transmit the URI for the container C to the playback device 200. Thus the container C is set for playback as BGM in the playback device 200.

Next, the content acquisition portion 223 of the playback device 200 transmits an acquisition request to the content provision device 300 for the music content in the container C, based on the URI for the container C (Step S552). Once the music content in the container C has been received from the content provision device 300 (Step S554), the content playback portion 224 of the playback device 200 starts the playback of the received music content (Step S556).

In this manner, additions and changes can be made to the BGM during the slide show display with BGM by setting a different container as the BGM in the playback device 200.

Note that in a case where nothing is designated as the container information to be transmitted to the playback device 200 at Step S550 (that is, in a case where an empty parameter is designated in the AVT:X_SetBGMURI action), the BGM setting that had been set previously in the playback device 200 is cancelled, so the BGM playback can be halted.

The slide show display with BGM can be implemented using the processing described above. The method according to the present form makes it possible for the information processing device 100 to control the playback device 200 using a simpler control procedure. It is also possible to utilize a wider range of functions, such as the addition, modification, deletion, and the like of the BGM during the playback of the slide show.

Third Form

Figure 12:
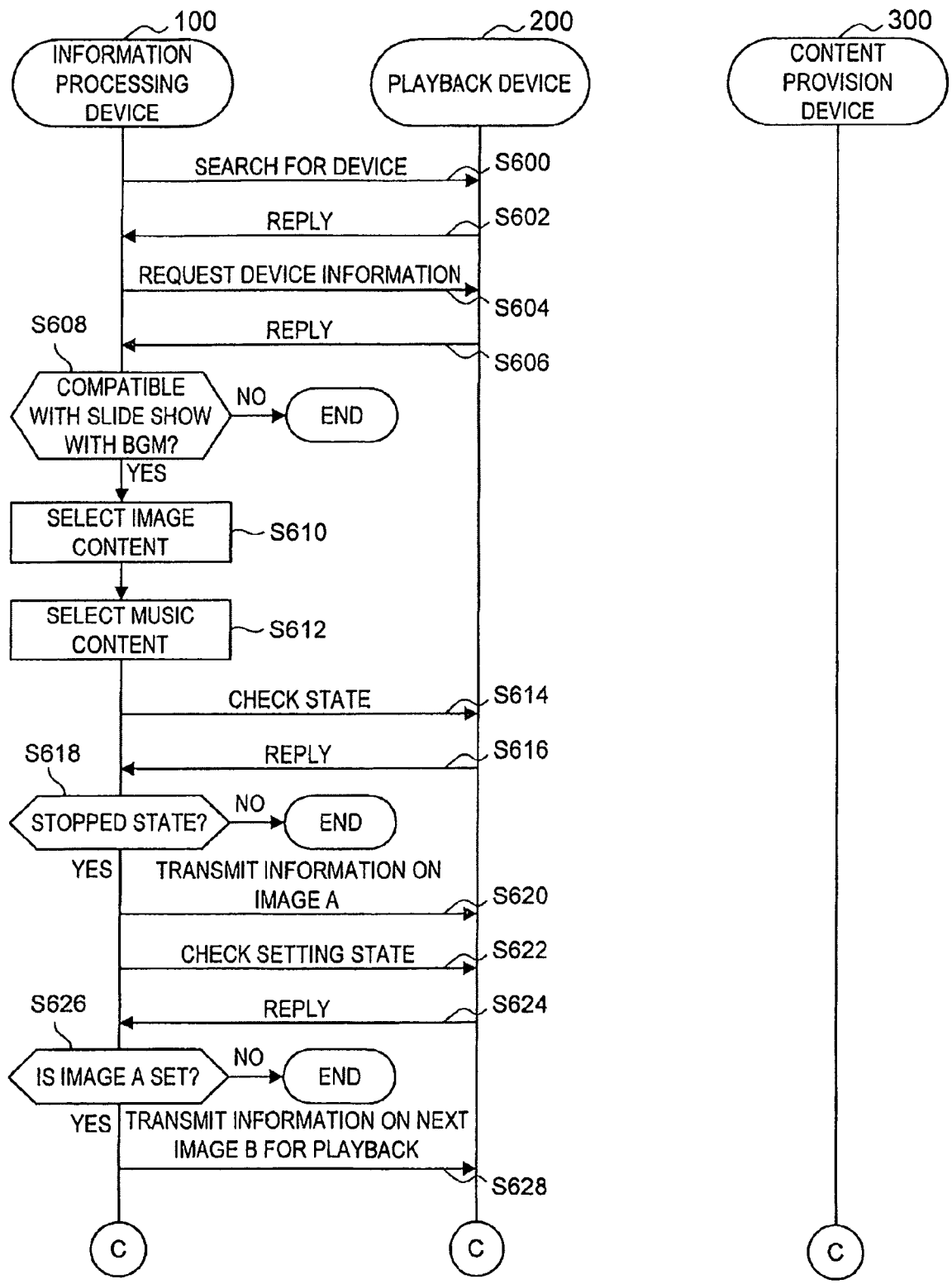
FIG. 12 is a sequence chart that shows a flow of processing by a slide show display method according to a third form of the method.
Figure 13:
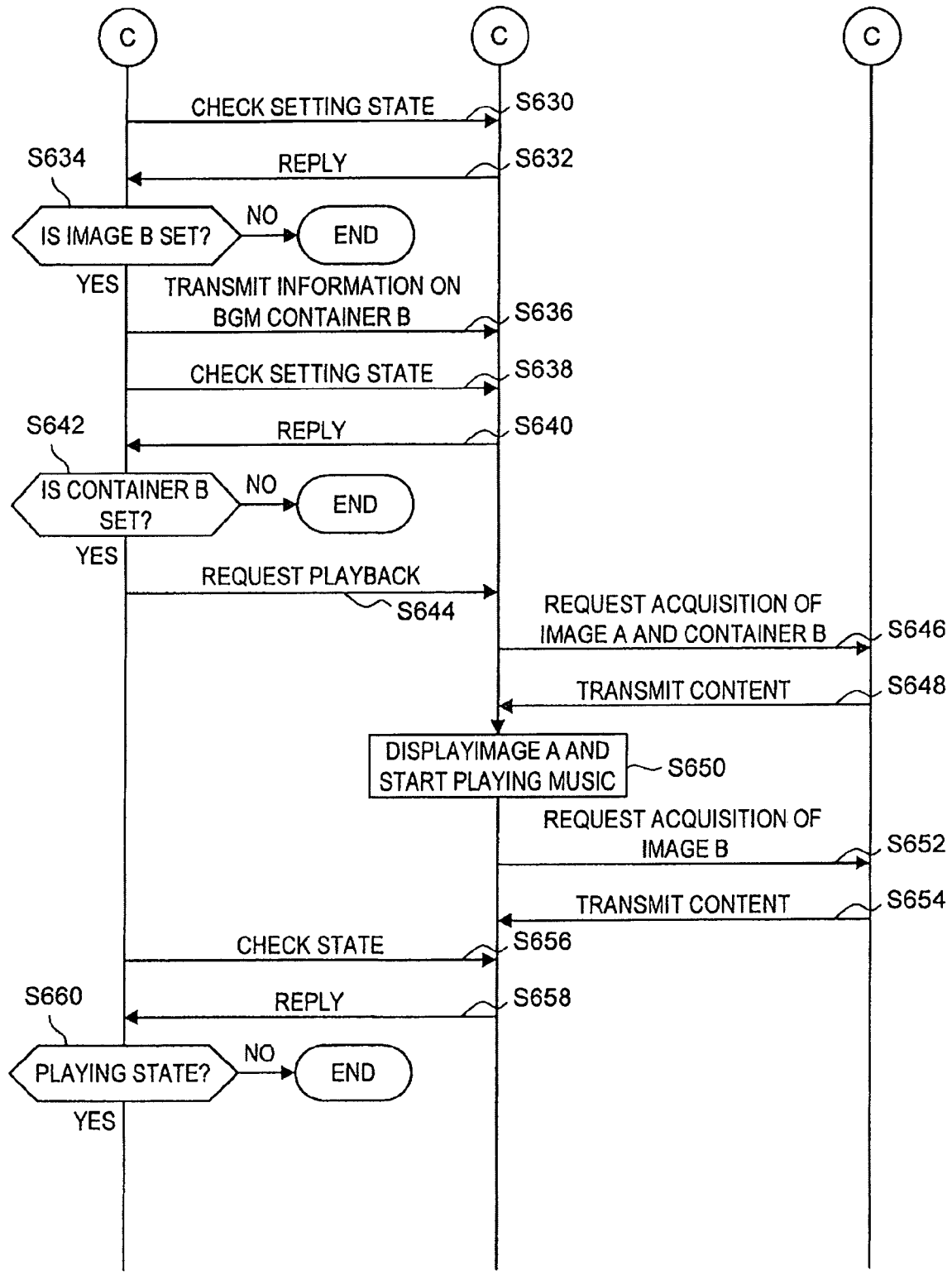
FIG. 13 is a sequence chart that shows a flow of processing by the slide show display method according to the third form of the method.

Next, a slide show display method with BGM according to a third form will be explained with reference to FIGS. 12 and 13. The slide show display method with BGM according to the present form is a combination of the methods described in the first and second forms. The present form is characterized in that the image content is designated by the same sort of method as in the first form, while the music content is designated by the same sort of method as in the second form.

Note that in the explanation that follows, parts that perform substantially the same processing as in the first and second forms will be abbreviated in order to avoid reduplicative explanations.

Steps S600 to S618 are the same as the corresponding processing in the first and second forms described above, so the explanation of these steps will be omitted. Note that at Step S608, the method by which the device search portion 120 of the information processing device 100 determines whether or not the playback device 200 is a device that is capable of displaying a slide show with BGM can be the method that is used in the second form (according to whether or not the AVT:X_SetBGMURI action is included in the service description).

After the information processing device 100 checks the state of the playback device 200, the content information notification portion 123 of the information processing device 100 takes information on the image content (image A) that will be the first displayed of the selected image content and transmits it to the playback device 200 (Step S620). What is different from the first form is that the information on the music content is not transmitted at this point, but is transmitted later by the same method that is used in the second form.

Next, the state control portion 121 of the information processing device 100 checks whether or not the image A has been set as the content for playback in the playback device 200 (Steps S622 to S626). This processing is the same as that at Steps S422 to S426 in the first form.

Next, the content information notification portion 123 of the information processing device 100 transmits to the playback device 200 information on the image content (image B) that will be displayed after the image A (Step S628). Next, the state control portion 121 of the information processing device 100 checks whether or not the image B has been set as the image to be displayed next in the playback device 200 (Steps S630 to S634). The processing at Steps S628 to S634 is the same as that at Steps S428 to S434 in the first form.

Next, the content information notification portion 123 of the information processing device 100 transmits to the playback device 200 information on the container B for the music content that will be played back as BGM (Step S636). Then the state control portion 121 of the information processing device 100 checks whether or not the container B has been set for playback as BGM (Steps S638 to S642). The processing at Steps S636 to S642 is the same as that at Steps S528 to S534 in the second form.

Once it has been confirmed that the image A and the BGM container B have both been set for playback, the playback request portion 124 of the information processing device 100 requests that the playback device 200 perform the playback processing (Step S644). Then the content acquisition portion 223 of the playback device 200 acquires, from the content provision device 300, the image A that has been set for playback and the content of the container B that has been set as BGM (Steps S646 to S648). Next, the content playback portion 224 of the playback device 200 displays the image A on the display 207 and starts the playback of the container B music content (Step S650).

Next, the content acquisition portion 223 of the playback device 200 acquires from the content provision device 300 the image B that has been designated to be played back next (Steps S652 to S654). Then the state control portion 121 of the information processing device 100 checks whether or not the playback device 200 is in the playing state (Steps S656 to S660). The processing at Steps S656 to S660 is the same as that at Steps S448 to S452 in the first form.

Thereafter, the content information notification portion 123 of the information processing device 100, by repeatedly performing the same processing as that at Steps S454 to S464 in the first form, sequentially designates the images to be displayed next. Using the image content information (the URIs and the like) that was transmitted from the information processing device 100, the playback device 200 acquires the content from the content provision device 300 and displays it on the display 207.

Fourth Form

Figure 14:
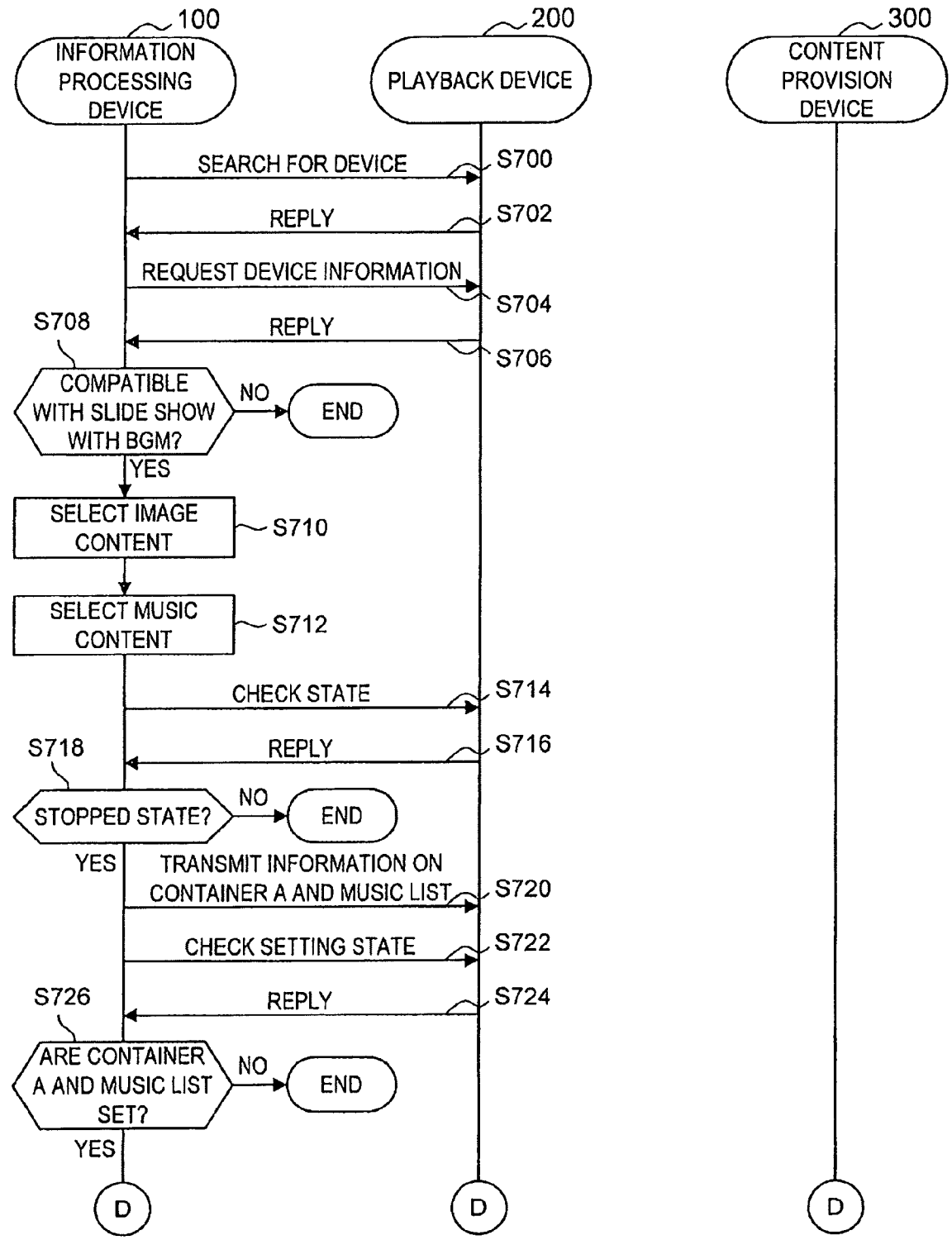
FIG. 14 is a sequence chart that shows a flow of processing by a slide show display method according to a fourth form of the method.
Figure 15:
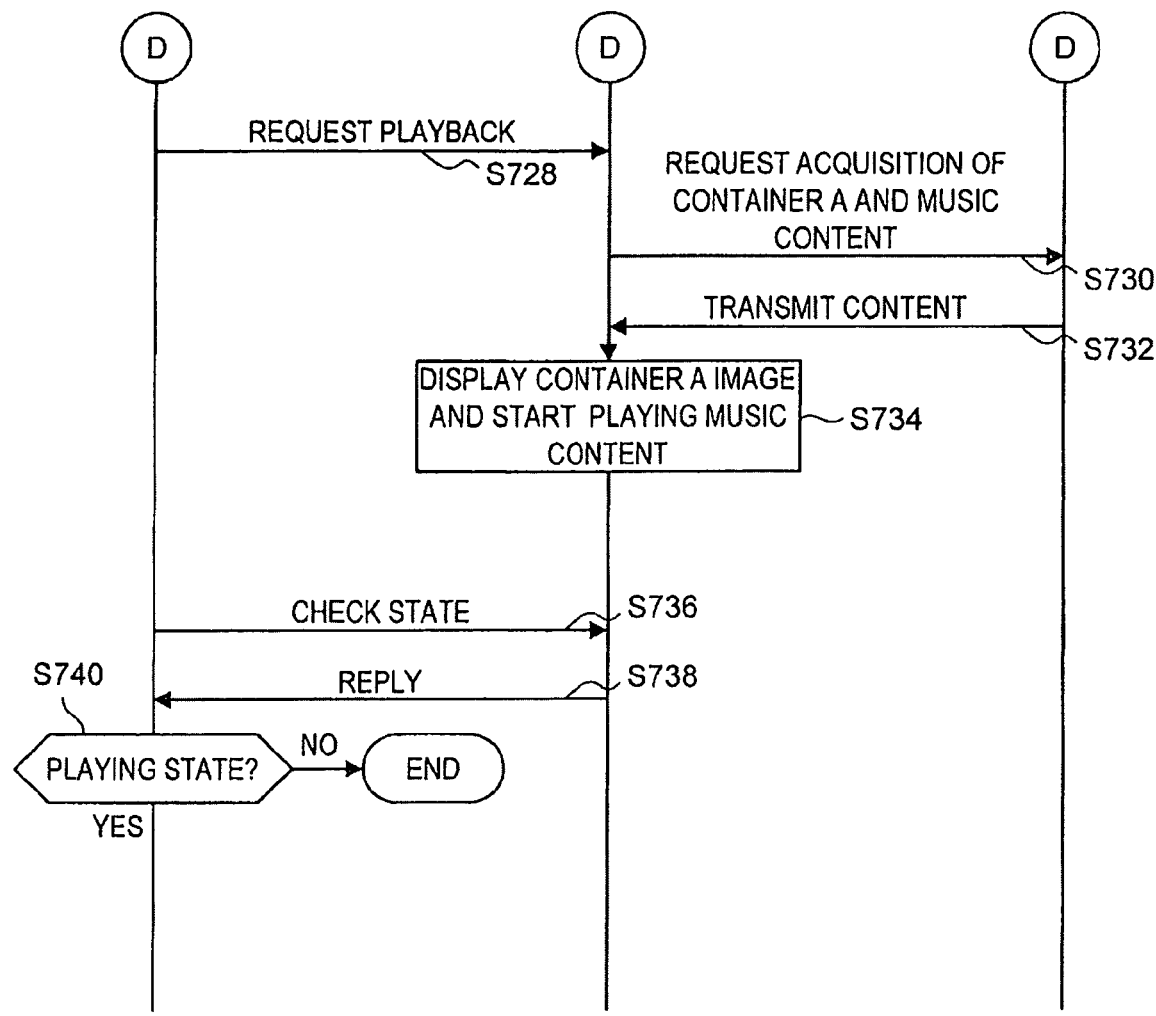
FIG. 15 is a sequence chart that shows a flow of processing by the slide show display method according to the fourth form of the method.

Next, a slide show display method with BGM according to a fourth form will be explained with reference to FIGS. 14 and 15. In the same manner as in the third form, the slide show display method with BGM according to the present form is a combination of the methods described in the first and second forms. The present form is characterized in that the image content is designated by the same sort of method as in the second form, while the music content is designated by the same sort of method as in the first form.

Note that in the explanation that follows, parts that perform substantially the same processing as in the first to third forms will be abbreviated in order to avoid reduplicative explanations.

Steps S700 to S718 are the same as the corresponding processing in the first to third forms described above, so the explanation of these steps will be omitted. Note that at Step S708, the method by which the device search portion 120 of the information processing device 100 determines whether or not the playback device 200 is a device that is capable of displaying a slide show with BGM can be the method that is used in the first form (according to whether or not the av:X_MaxBGMCount is designated in the device description).

Next, the content information notification portion 123 of the information processing device 100 takes information on the image content container A that was selected at Steps S710 to S712 and a list of the music content and transmits them to the playback device 200 (Step S720). In the same manner as in the first form, the AVT:SetAVTransportURI action or the like, for example, may be used to transmit the image content container A and the music list to the playback device 200. This causes the image content container A and the music list to be set for playback in the playback device 200.

Next, the state control portion 121 of the information processing device 100 checks whether or not the container A and the music list have been set as the content for playback in the playback device 200 (Steps S722 to S726). This processing is the same as that at Steps S422 to S426 in the first form.

Once it has been confirmed that the container A and the music list have been set for playback in the playback device 200, the playback request portion 124 of the information processing device 100 requests that the playback device 200 perform the playback processing (Step S728).

Once the playback request has been received from the information processing device 100, the content acquisition portion 223 of the playback device 200 acquires the image content in the container A and the music content in the music list from the content provision device 300 (Steps S730 to S732). Next, the content playback portion 224 of the playback device 200 displays sequentially on the display 207 the image content that is contained in the acquired container A and starts the playback of the music content (Step S734).

Next, the state control portion 121 of the information processing device 100 checks whether or not the playback device 200 is in the playing state (Steps S736 to S740). The processing at Steps S736 to S740 is the same as that at Steps S448 to S452 in the first form.

Note that the order of the individual steps in the various forms described above is not limited to the examples provided, and various modifications are possible.

It should be understood by those skilled in the art that various modifications, combinations, sub-combinations and alterations may occur depending on design requirements and other factors insofar as they are within the scope of the appended claims or the equivalents thereof.

For example, in the embodiment described above, it was explained that both the image content and the music content are stored in the same content provision device, but the present invention is not limited to this example. For example, two content provision devices may be provided, and the image content and the music content may be stored in the separate content provision devices. Alternatively, one of the image content and the music content may be stored in the content provision device, and the other may be stored in the playback device. Furthermore, the content provision device and the playback device may exist within a single unit.

What is claimed is:

1. A slide show display system with background music (BGM) that comprises at least one content provision device that stores a plurality of individual images and music content and provides the plurality of individual images and the music content, a playback device that plays back each of the plurality of individual images, in time sequence as a slide show, and the music content, and an information processing device that controls displaying the slide show with BGM on the playback device, using each of the plurality of individual images and music content that are selected for playback from the plurality of individual images and the music content that are stored in the at least one content provision device, wherein the information processing device includes
a playback selection input portion that inputs information on the plurality of individual images and the music content that are selected for playback,
a content information notification portion that transmits image content information that identifies a storage location of the plurality of individual images at the at least one content provision device and music content information that identifies a storage location of the music content at the at least one content provision device, and
a playback request portion that makes a playback request to the playback device to play back each of the plurality of individual images, in time sequence as the slide show, and the music content that have been selected for playback, and wherein the playback device includes
a content acquisition portion that acquires the plurality of individual images and the music content that are selected for playback from the at least one content provision device, based on the image content information and the music content information that are transmitted from the information processing device, and a content playback portion that, in response to the playback request from the information processing device, displays the acquired plurality of individual images, in time sequence as the slide show, and plays back the acquired music content.

2. The slide show display system with BGM according to claim 1, wherein the content information notification portion transmits to the playback device at least one item of the image content information that respectively pertains to at least one of the plurality of individual images that is selected for playback, the image content information being transmitted sequentially in the time sequence in which the at least one of the plurality of individual images is played back.

3. The slide show display system with BGM according to claim 1, wherein the content information notification portion transmits to the playback device a music list that includes at least one item of the music content information that respectively pertains to the at least one of the music content that is selected for playback.

4. The slide show display system with BGM according to claim 1, wherein the content acquisition portion of the playback device, in a case where the music content information is transmitted from the content information notification portion of the information processing device while the plurality of individual images and the music content are being played back by the content playback portion, acquires the music content based on the transmitted music content information, and the content playback portion plays back the acquired music content.

5. The slide show display system with BGM according to claim 2, wherein the content information notification portion transmits the image content information that corresponds to one of the plurality of individual images that will be played back soonest in the time sequence and also transmits the image content information that corresponds to one of the plurality of individual images that will be played back following the one of the plurality of individual images image content that will be played back soonest in the time sequence.

6. The slide show display system with BGM according to claim 3, wherein a maximum number of items of the music content information that are included in the music list is designated by the playback device.

7. The slide show display system with BGM according to claim 3, wherein the content information notification portion transmits the music list together with the image content information that corresponds to one of the plurality of individual images that will be played back first in the time sequence.

8. A slide show display method with background music (BGM) for a slide show display system with BGM that includes at least one content provision device that stores a plurality of individual images and music content and provides at least one of the image content and the music content, a playback device that plays back each of the plurality of individual images in time sequence, as a slide show, and the music content, and an information processing device that controls displaying the slide show with BGM on the playback device, using each of the plurality of individual images and music content that are selected for playback from the plurality of individual images and the music content that are stored in the at least one content provision device, the slide show display method with BGM comprising the steps of:

inputting, in the information processing device, information on the plurality of individual images and the music content that are selected for playback;

transmitting to the playback device, by the information processing device, image content information that identifies a storage location of the plurality of individual images at the at least one content provision device and music content information that identifies a storage location of the music content at the at least one content provision device;

making a playback request to the playback device, by the information processing device, to play back each of the plurality of individual images, in time sequence as the slide show, and the music content that have been selected for playback;

acquiring, by the playback device and from the at least one content provision device, the plurality of individual images and the music content that are selected for playback, based on the image content information and the music content information that are transmitted from the information processing device; and displaying the acquired plurality of individual images, in time sequence as the slide show, and playing back the acquired music content, by the playback device in response to the playback request from the information processing device.

9. An information processing device that controls displaying a slide show with background music (BGM) on a playback device, using a plurality of individual images and music content provided by at least one content provision device in which the plurality of individual images and the music content are stored, the information processing device comprising:

a playback selection input portion that inputs information on the plurality of individual images and the music content that are selected for playback;

a content information notification portion that transmits image content information that identifies a storage location of the plurality of individual images at the at least one content provision device and music content information that identifies a storage location of the music content at the at least one content provision device; and a playback request portion that makes a playback request to the playback device to play back each of the plurality of individual images, in time sequence as the slide show, and the music content that have been selected for playback.

10. A playback device that displays a slide show with background music (BGM) by playing back, based on control by an information processing device, a plurality of individual images, in time sequence, as the slide show and music content that are provided by at least one content provision device in which the plurality of individual images and the music content are stored, the playback device comprising:

a content acquisition portion that acquires, from the at least one content provision device, the plurality of individual images and the music content that are selected for playback, based on image content information that identifies a storage location of the plurality of individual images at the at least one content provision device and music content information that identifies a storage location of the music content at the at least one content provision device, the image content information and the music content information being transmitted from the information processing device; and a content playback portion that, in response to a playback request from the information processing device, displays the acquired plurality of individual images, in time sequence as the slide show, and plays back the acquired music content.

11. A non-transitory computer readable medium including computer program instructions, which when executed by an information processing apparatus, cause the information processing apparatus to perform a method of controlling display of a slide show with background music (BGM) on a playback device, using a plurality of individual images and music content provided by at least one content provision device in which the plurality of individual images and the music content are stored, the method comprising:

inputting information on the plurality of individual images and the music content that are selected for playback;

transmitting image content information that identifies a storage location of the plurality of individual images at the at least one content provision device and music content information that identifies a storage location of the music content at the at least one content provision device; and making a playback request to the playback device to play back each of the plurality of individual images, in time sequence as the slide show, and the music content that have been selected for playback.

12. A non-transitory computer-readable medium including computer program instructions, which when executed by a playback device, cause the playback device to perform a method of displaying a slide show with background music (BGM) by playing back, based on control by an information processing device, a plurality of individual images, in time sequence as the slide show, and music content that are provided by at least one content provision device in which the plurality of individual images and the music content are stored, the method comprising:

acquiring, from the at least one content provision device, the plurality of individual images and the music content that are selected for playback, based on image content information that identifies a storage location of the plurality of individual images at the at least one content provision device and music content information that identifies a storage location of the music content at the at least one content provision device, the image content information and the music content information being transmitted from the information processing device, and displaying, in response to a playback request from the information processing device, the acquired plurality of individual images, in time sequence as the slide show, and playing back the acquired music content.

* * * * *